US011721330B1

(12) United States Patent
Pandey et al.

(10) Patent No.: US 11,721,330 B1
(45) Date of Patent: Aug. 8, 2023

(54) NATURAL LANGUAGE INPUT PROCESSING

(71) Applicant: Amazon Technologies, Inc., Seattle, WA (US)

(72) Inventors: Rajesh Kumar Pandey, Bothell, WA (US); Julia Kennedy Nemer, Seattle, WA (US); David Thomas, Woodinville, WA (US); Isaac Joseph Madwed, Seattle, WA (US); Rashmi Tonge, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 611 days.

(21) Appl. No.: 16/559,952

(22) Filed: Sep. 4, 2019

(51) Int. Cl.
| | |
|---|---|
| *G10L 15/22* | (2006.01) |
| *G10L 15/32* | (2013.01) |
| *G10L 13/00* | (2006.01) |
| *G10L 15/26* | (2006.01) |
| *G10L 17/00* | (2013.01) |

(52) U.S. Cl.
CPC ............... *G10L 15/22* (2013.01); *G10L 13/00* (2013.01); *G10L 15/26* (2013.01); *G10L 15/32* (2013.01); *G10L 17/00* (2013.01); *G10L 2015/223* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 9,653,070 B2* | 5/2017 | Chang et al. | G10L 15/14 |
| 9,898,459 B2* | 2/2018 | Tang | G06F 40/284 |
| 10,482,904 B1* | 11/2019 | Hardie et al. | G10L 15/22 |
| 10,957,313 B1* | 3/2021 | Sarikaya et al. | G06F 40/117 |
| 10,971,157 B2* | 4/2021 | Willett et al. | G10L 15/30 |
| 11,145,298 B2* | 10/2021 | Maker et al. | G10L 21/0232 |
| 11,216,474 B2* | 1/2022 | Pandey et al. | G06F 16/2455 |
| 11,238,850 B2* | 2/2022 | Mukherjee et al. | G06Q 30/0641 |
| 11,335,346 B1* | 5/2022 | Su et al. | G06F 40/295 |
| 11,461,779 B1* | 10/2022 | Dabas et al. | G10L 15/187 |

(Continued)

*Primary Examiner* — Neeraj Sharma
(74) *Attorney, Agent, or Firm* — PIERCE ATWOOD LLP

(57) ABSTRACT

Techniques for intelligently selecting a component to execute with respect to a natural language user input are described. A natural language processing (NLP) system may receive first data representing a natural language input. The NLP system may determine first and second scores representing first and second confidences that first and second components are to be invoked to perform actions responsive to the natural language input, respectively. Based on the first and second scores, the NLP system may determine further information is needed to determine which of the first or second component is to be invoked. The NLP system may query a user for the further information. Based on the further information, the NLP system may determine third and fourth scores representing third and fourth confidences that the first and second components are to be invoked to perform actions responsive to the natural language input, respectively. The NLP system may determine the third score is greater than the fourth score and, based thereon, cause the first component to perform an action responsive to the original natural language input.

20 Claims, 14 Drawing Sheets

(56) References Cited

U.S. PATENT DOCUMENTS

| | | | |
|---|---|---|---|
| 11,482,210 B2* | 10/2022 | Park | G06F 18/217 |
| 2016/0019896 A1* | 1/2016 | Alvarez Guevara et al. | G10L 19/00 704/249 |
| 2018/0090141 A1* | 3/2018 | Periorellis et al. | G10L 15/1815 |
| 2018/0293983 A1* | 10/2018 | Choi et al. | G10L 15/1815 |
| 2019/0318759 A1* | 10/2019 | Doshi et al. | G10L 15/04 |
| 2019/0333522 A1* | 10/2019 | Lesso | G10L 17/06 |
| 2020/0004831 A1* | 1/2020 | Burceanu et al. | G06F 40/146 |
| 2020/0050788 A1* | 2/2020 | Feuz et al. | G10L 15/30 |
| 2021/0067470 A1* | 3/2021 | Freed et al. | G06F 18/23 |
| 2021/0334478 A1* | 10/2021 | Greenberg et al. | G10L 15/005 |
| 2022/0139377 A1* | 5/2022 | Lee et al. | G06F 3/16 704/200 |

\* cited by examiner

FIG. 1A
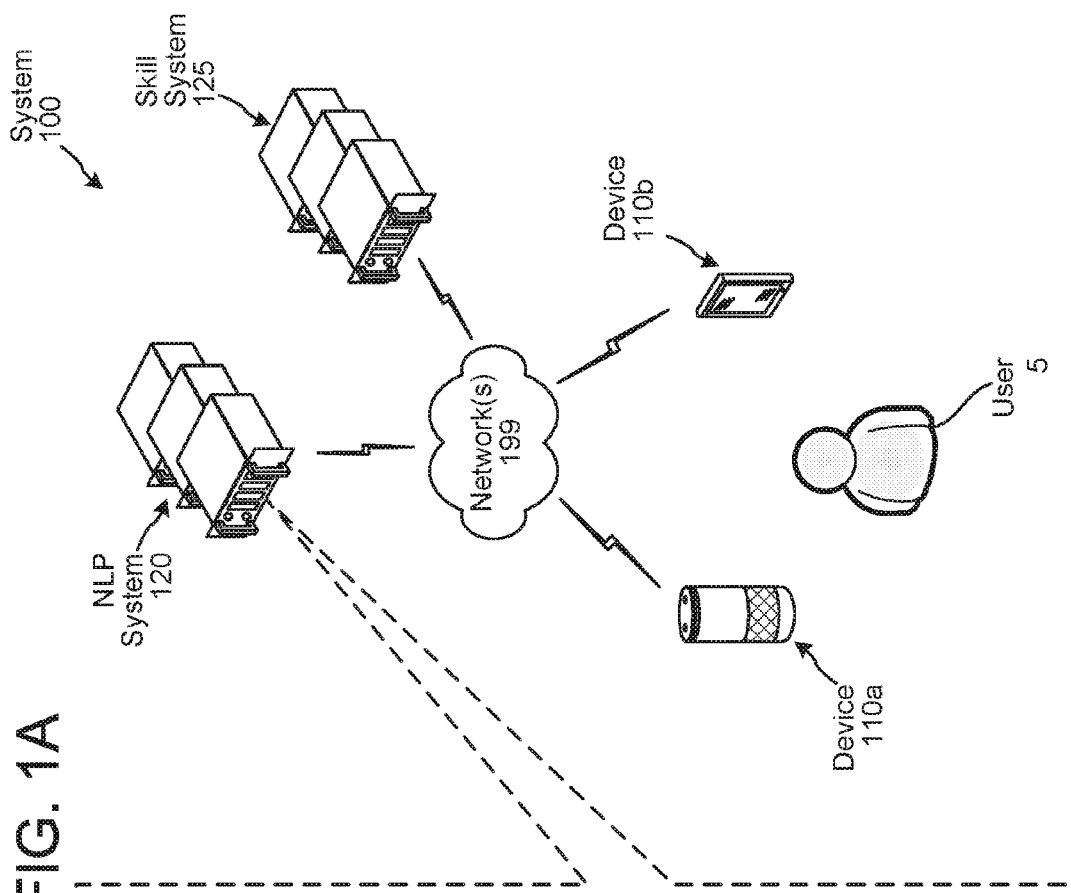
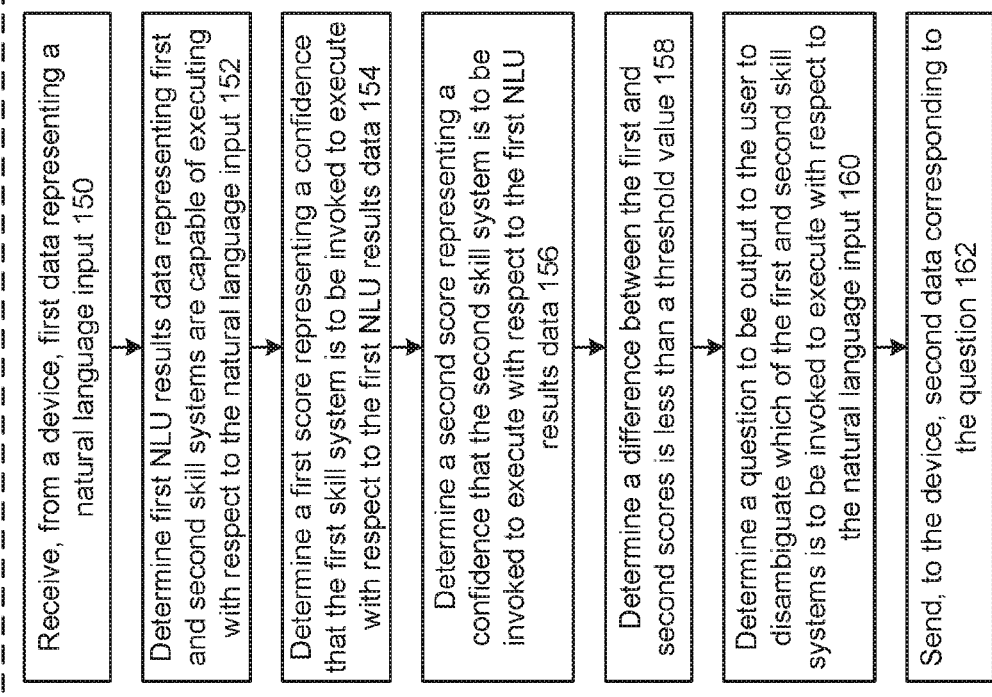

FIG. 1B
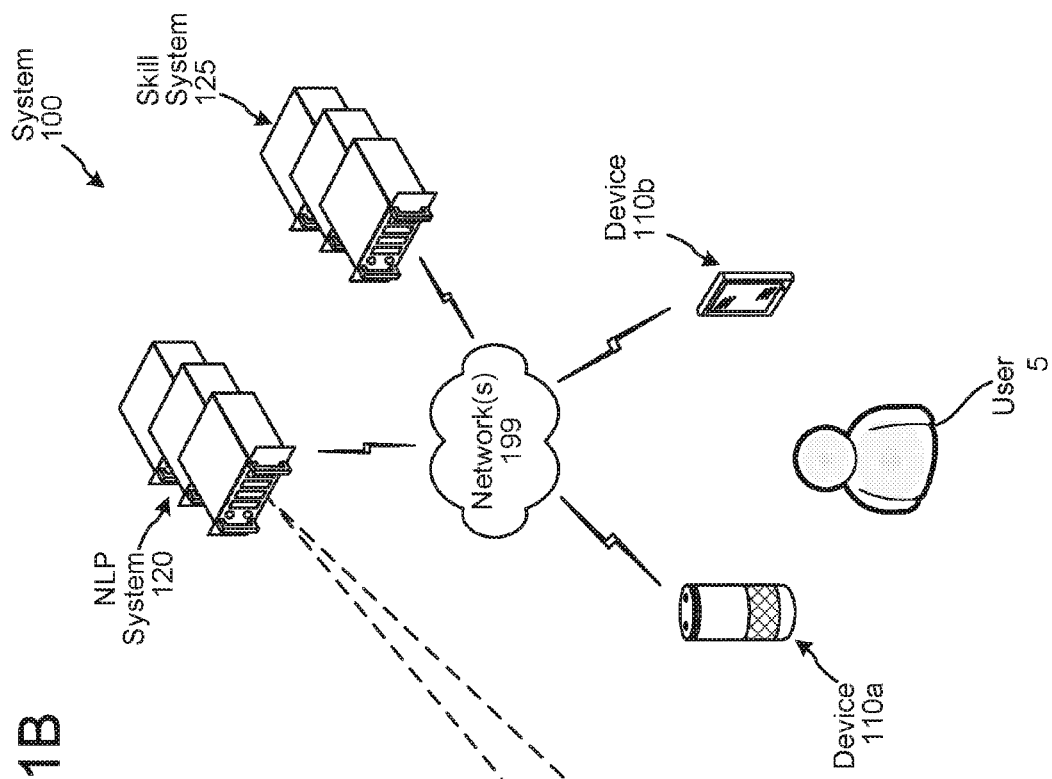
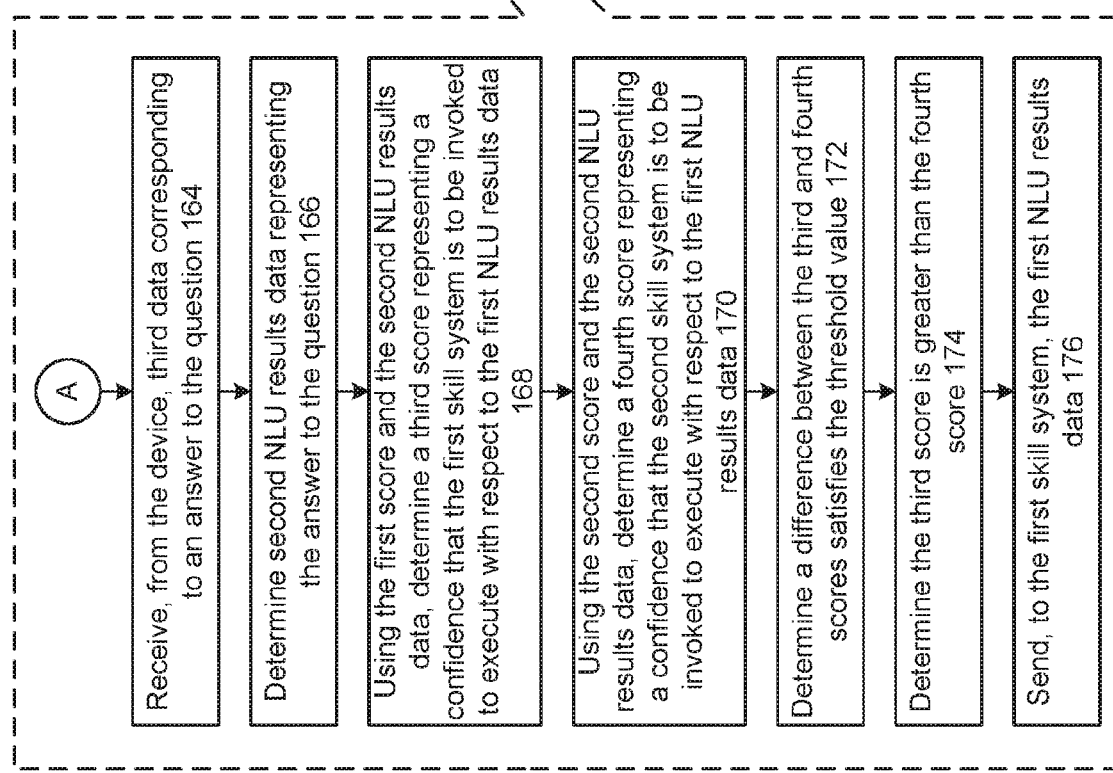

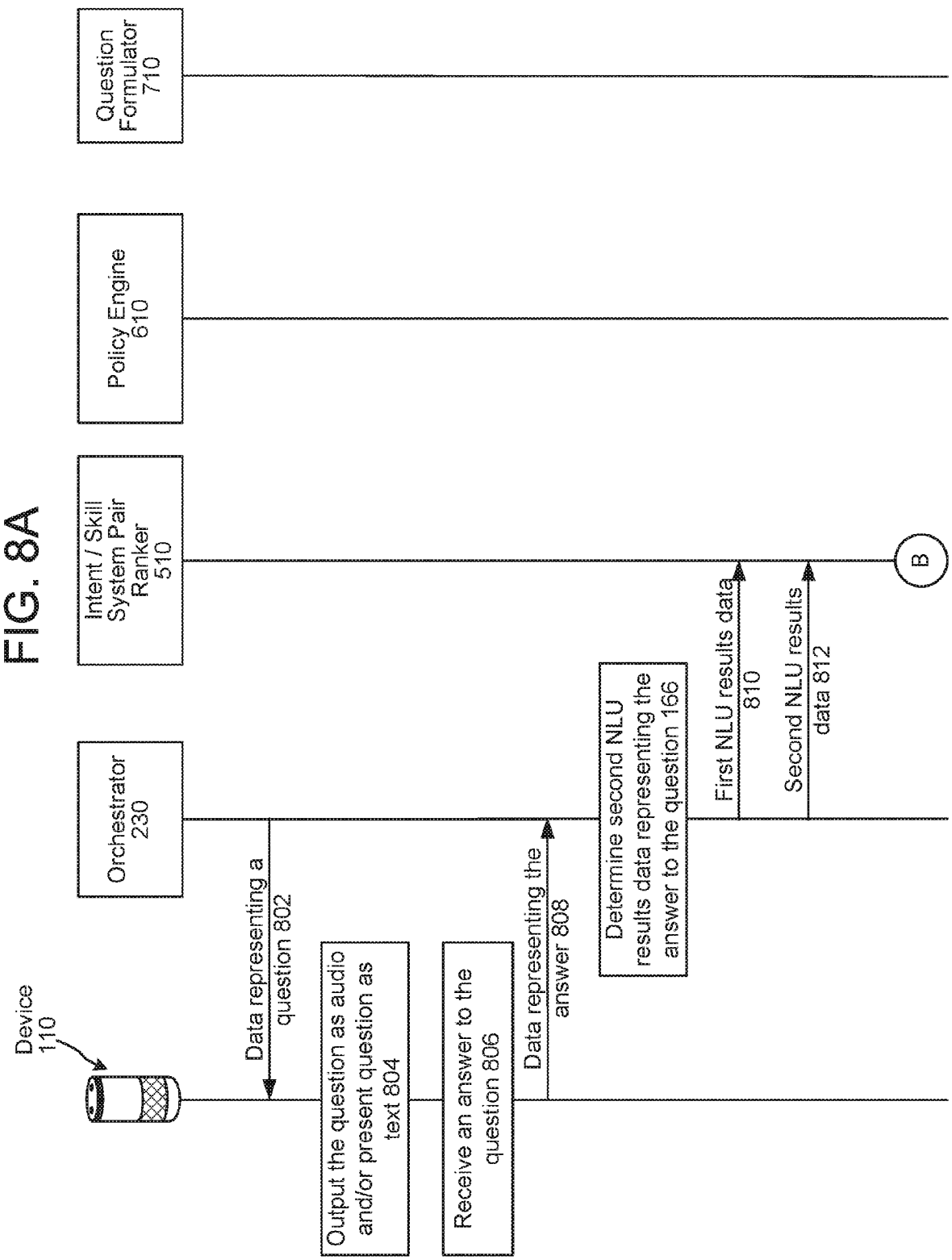

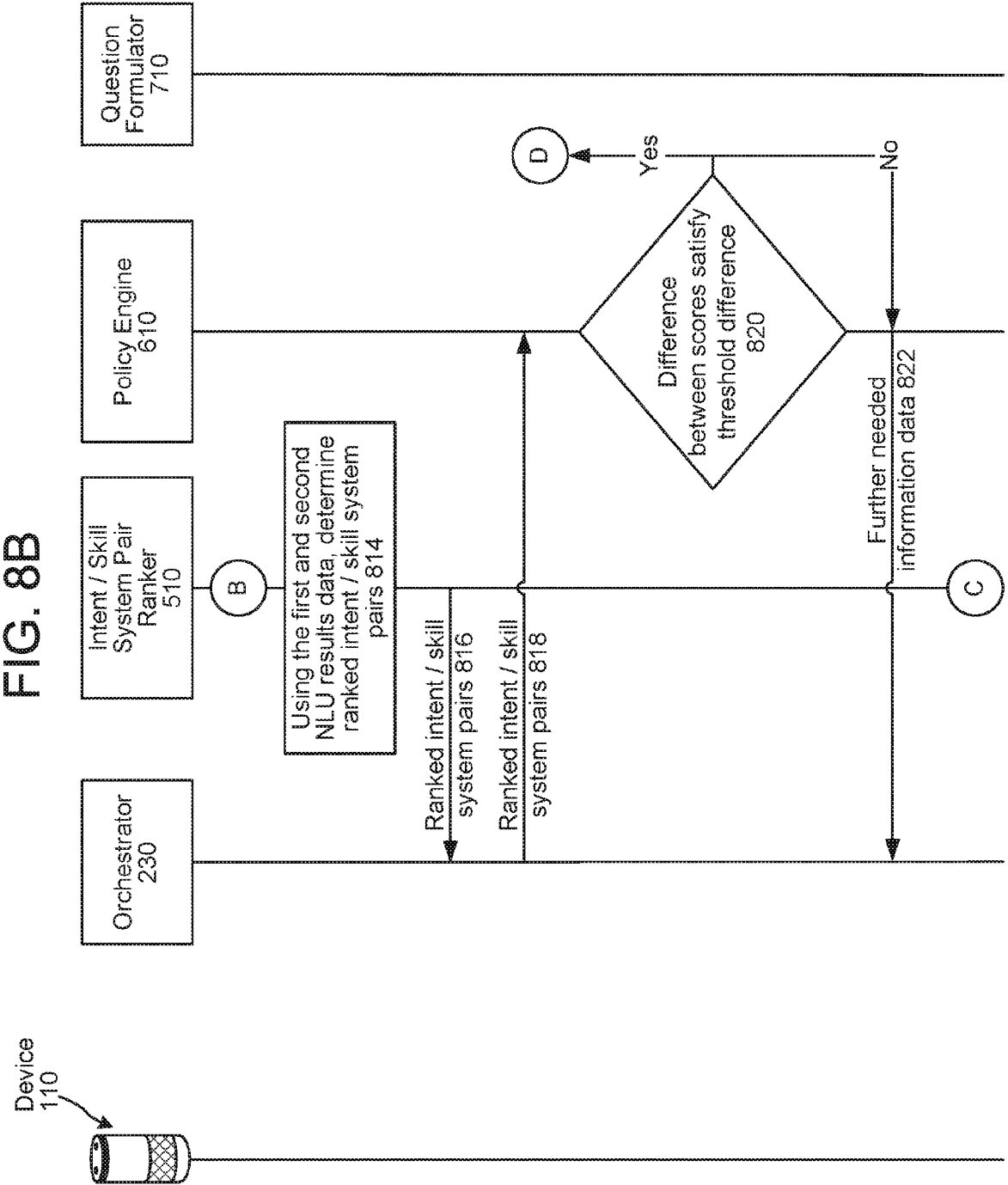

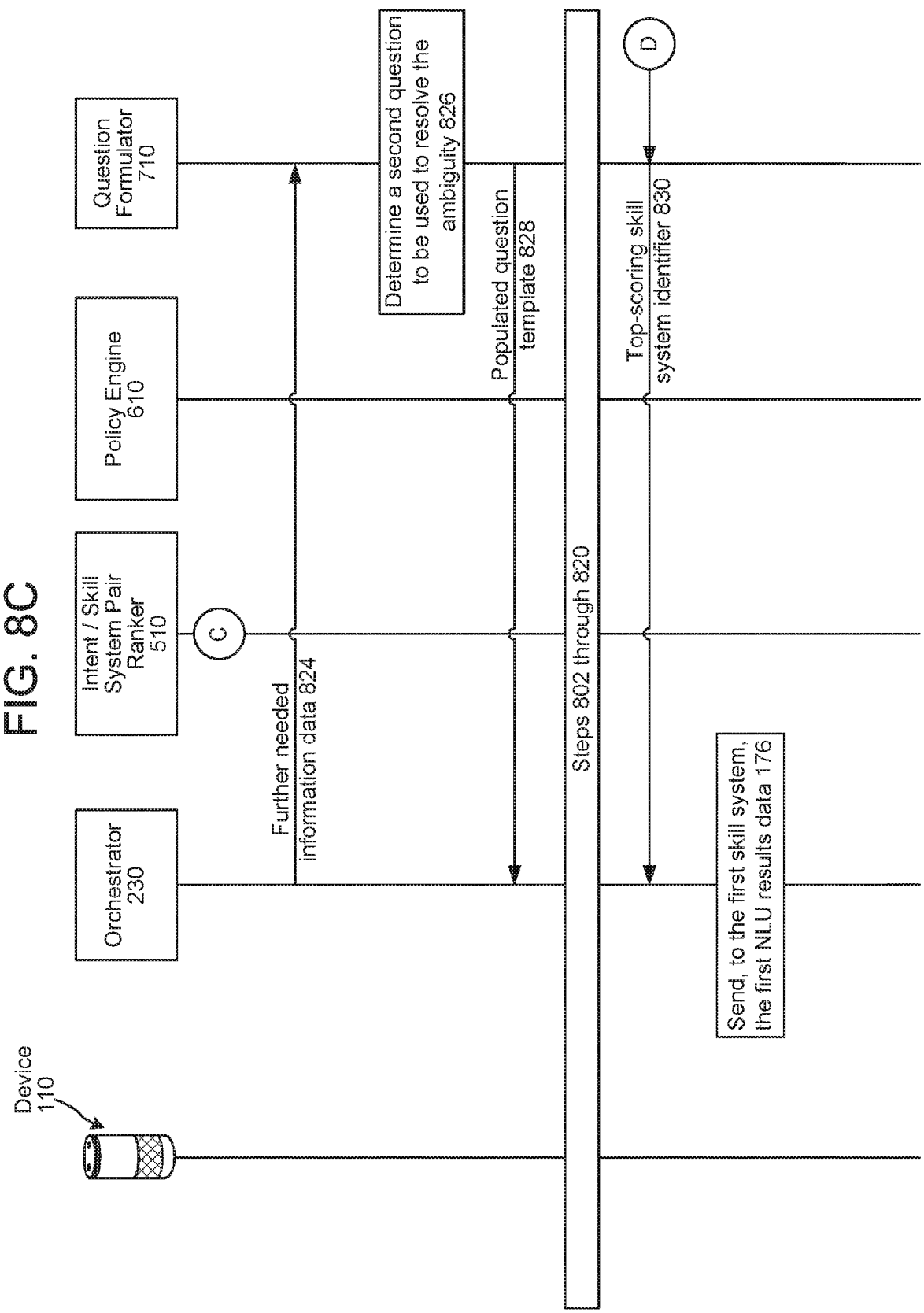

NATURAL LANGUAGE INPUT PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B are a conceptual diagram illustrating a system configured to determine which skill system to invoke to execute with respect to a natural language input when multiple skill systems are capable of executing with respect to the natural language input, in accordance with embodiments of the present disclosure.

FIGS. 8A through 8C are a signal flow diagram illustrating how skill system routing ambiguity may be resolved, in accordance with embodiments of the present disclosure.

DETAILED DESCRIPTION

Figure 2:
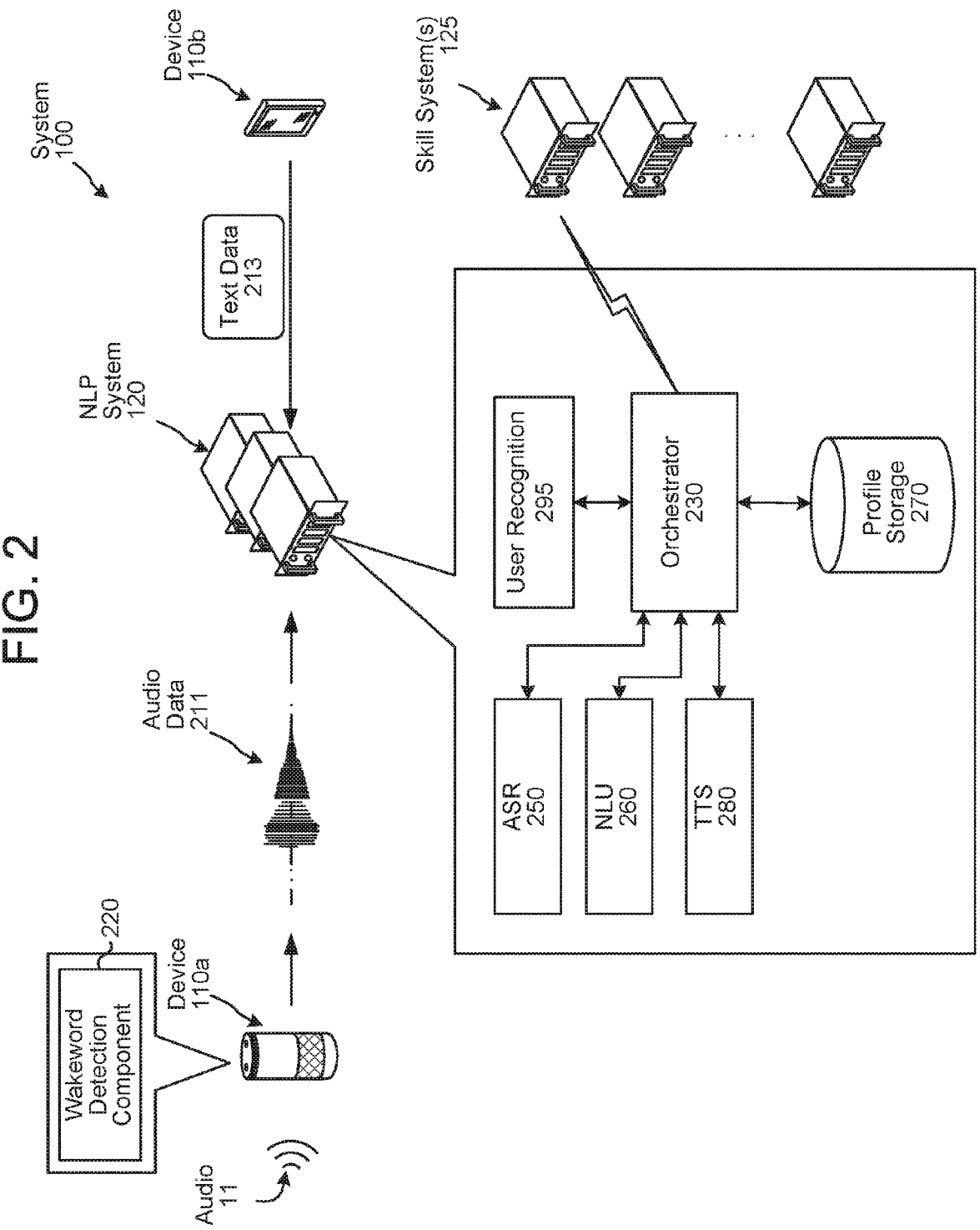
FIG. 2 is a conceptual diagram of components of the system, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A natural language processing (NLP) system may cause skill systems to perform actions in response to natural language inputs (e.g., text/typed inputs and/or spoken inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "book me a ride to my favorite restaurant," a taxi skill system may be invoked to book a trip to the user's favorite restaurant (e.g., as represented in the user's profile), and the taxi skill system may cause the NLP system to output synthesized speech representing such booking. In the foregoing examples, actions correspond to the outputting of music, turning on of "smart" lights, and booking of the trip coupled with output of the synthesized speech. As such, as used herein, an "action" may refer to some result of a system's processing.

An NLP system may perform NLU processing to determine a meaning representing a natural language input. In at least some examples, NLU processing may represent a meaning as an intent. For example, the natural language input "play Adele music" may correspond to a <PlayMusic> intent. For further example, the natural language input "turn on the lights" may correspond to the <ActivateLight> intent. In another example, the natural language input "book me a ride to my favorite restaurant" may correspond to a <BookRide> intent.

More than one skill system may be configured to execute with respect to the same intent. For example, first and second skill systems corresponding to first and second music streaming services, respectively, may both be configured to execute with respect to the <PlayMusic> intent. For further example, first and second skill systems corresponding to first and second taxi businesses, respectively, may both be configured to execute with respect to the <BookRide> intent.

In some instances, a user's profile may represent multiple skill systems (each configured to execute with respect to the same intent) as being enabled. Generally, an enabled skill system is one that is permitted to be invoked to execute with respect to natural language inputs of the user. In at least some examples, an enabled skill system is one whose application is downloaded to a user's device (e.g., smart phone). In at least some examples, an enabled skill system is one that has a voice-assistant shortcut executed on a device (e.g., smart phone) of a user. Other examples of enablement are possible and envisioned herein.

When the user provides a natural language input that corresponds to the intent executable by the multiple, enabled skill systems, difficulties may arise as to which skill system should be invoked to execute with respect to the natural language input.

The present disclosure provides techniques for determining which skill system should be invoked to execute with respect to a natural language input, when multiple skill systems are able to execute with respect to the natural language input. The teachings of the present disclosure have several benefits including, but not limited to, increasing a user's experience with an NLP system.

A system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A and 1B show a system 100 configured to determine which skill system to invoke to execute with respect to a natural language input when multiple skill systems are capable of executing with respect to the natural language input. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include one or more devices (110a/110b), local to a user 5, a NLP system 120, and a skill system 125 that communicate across the one or more networks 199. While the user 5 is illustrated as being a human, other types of users (e.g., computing systems) may exist.

The device 110a may receive audio corresponding to a spoken natural language input originating from the user 5. The device 110a may generate audio data corresponding to the audio and may send the audio data to the NLP system 120. Alternatively, the device 110b may receive a typed natural language input from the user 5. The device 110b may generate text data corresponding to the typed input and may send the text data to the NLP system 120.

The device 110 may send the audio data and/or the text data to the NLP system 120 via an application that is installed on the device 110 and associated with the NLP system 120. An example of such an application is the Amazon Alexa application that may be installed on a smart phone, tablet, or the like.

The NLP system 120 may receive (150) first data representing the natural language input. The first data may be audio data or text data sent from the device 110a or 110b, respectively.

The NLP system 120 may determine (152) first NLU results data representing first and second skill systems are capable of executing with respect to the natural language input. If the first data is text data, the NLP system 120 may perform NLU processing on the received text data to determine the first NLU results data. If the first data is audio data, the NLP system 120 may perform ASR processing on the received audio data to generate text data, and may perform NLU processing on the generated text data to determine the first NLU results data. Alternatively, if the first data is audio data, the NLP system 120 may perform spoken language understanding (SLU) processing on the received audio data to determine the first NLU results data (without first converting the audio data to text data).

After determining the first and second skill systems are capable of executing with respect to the natural language input, the NLP system 120 may determine (154) a first score representing a confidence that the first skill system is to be invoked to execute with respect to the first NLU results data. The NLP system 120 may also determine (156) a second score representing a confidence that the second skill system is to be invoked to execute with respect to the first NLU results data.

The NLP system 120 may determine (158) a difference between the first and second scores is less than a threshold value. The difference being less than the threshold value may represent that the NLP system 120 is not able to confidently determine which of the first and second skill systems should be invoked to execute with respect to the natural language input. Based on the difference being less than the threshold value, the NLP system 120 may determine (160) a question to be output to the user to disambiguate which of the first and second skill systems is to be invoked to execute with respect to the natural language input. The one or more questions may take on various formats. In at least some examples, a question may request confirmation from the user 5. An example of such a question is "I should invoke skill system 1, correct?" In at least some other examples, a question may request a user indicate which skill system is to be invoked. An example of such a question is "would you like me to invoke skill system 1 or skill system 2?" Other question formats are envisioned by the present disclosure.

The NLP system 120 may send (162), to the device (110a/110b), second data corresponding to the question. In at least some examples, the second data may be audio data corresponding to the question rendered as synthesized speech. In such examples, the device (110a/110b) may output audio corresponding to the synthesized speech. In at least some other examples, the second data may be text data corresponding to the question. In such examples, the device (110a/110b) may present text on a display of (or otherwise associated with) the device (110a/110b). In at least some other examples, the second data may include: (i) audio data corresponding to the question rendered as synthesized speech; and (ii) text data corresponding to the question. In such examples, one of the devices (110a/110b) may both (i) output audio corresponding to the synthesized speech and (ii) present text on a display of (or otherwise associated with) the device (110a/110b). Alternatively, the device 110a may output audio corresponding to the synthesized speech and the device 110b may present text on a display of (or otherwise associated with) the device 110b.

The device 110a may receive audio corresponding to a spoken natural language answer to the question. The device 110a may generate audio data corresponding to the audio and may send the audio data to the NLP system 120. Alternatively, the device 110b may receive a typed natural language answer to the question. The device 110b may generate text data corresponding to the typed natural language answer and may send the text data to the NLP system 120. Alternatively, the device (110a/110b) may present one or more virtual buttons corresponding to one or more potential answers to the question. The device (110a/110b) may detect a touch event on a display thereof, with the touch event corresponding to the selection of one of the one or more virtual buttons. The device (110a/110b) may send, to the NLP system 120, data representing which of the virtual buttons was selected. In at least some examples, the device (110a/110b) may send the audio data, text data, or data representing the selected virtual button to the NLP system 120 via an application installed on the device (110a/110b) and associated with the NLP system 120.

The NLP system 120 may receive (164), from the device (110a/110b), third data representing the answer to the question. The third data may be audio data when the device 110a receives a spoken natural language answer, text data when the device 110b receives a typed natural language answer, or text data when the device (110a/110b) detects the selection of a virtual button.

The NLP system 120 may determine (166) second NLU results data representing the answer to the question. If the third data is text data, the NLP system 120 may perform NLU processing on the received text data to determine the second NLU results data. If the third data is audio data, the NLP system 120 may perform ASR processing on the received audio data to generate text data, and may perform NLU processing on the generated text data to determine the second NLU results data. Alternatively, if the third data is audio data, the NLP system 120 may perform spoken language understanding (SLU) processing on the received audio data to determine the second NLU results data (without first converting the audio data to text data).

The NLP system 120 may, using the first score and the second NLU results data, determine (168) a third score representing a confidence that the first skill system is to be invoked to execute with respect to the first NLU results data. Additionally, the NLP system 120 may, using the second score and the second NLU results data, determine (170) a fourth score representing a confidence that the second skill system is to be invoked to execute with respect to the first NLU results data.

The NLP system 120 may determine (172) a difference between the third and fourth scores satisfies (e.g., equals or exceeds) the threshold value. The difference satisfying the threshold value may represent that the NLP system 120 is able to confidently determine which of the first and second skill systems should be invoked to execute with respect to the natural language input.

Based on the difference satisfying the threshold value, the NLP system 120 may determine (174) the third score is greater than the fourth score. Based on the third score being greater than the fourth score, and the third score corresponding to a confidence that the first skill system is to be invoked, the NLP system 120 may send (176), to the first skill system, the first NLU results data. Thereafter, the first skill system may use the first NLU results data to perform an action responsive to the natural language input.

The system 100 may operate using various components as described in FIG. 2. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the NLP system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN) / recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the NLP system 120. The audio data 211 may include data corresponding to the wakeword, or the device 110a may remove the portion of the audio corresponding to the wakeword prior to sending the audio data XAA11 to the NLP system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into ASR results data (e.g., text data). The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., sub-word units, such as phonemes, etc.) and sequences of sounds to identify words that match the sequence of sounds of the speech represented in the audio data 211. The ASR component 250 outputs text data representing one or more ASR hypotheses (with each ASR hypothesis representing a different interpretation of the speech). The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a typed natural language input. The device 110b may generate text data 213 representing the typed natural language input. The device 110b may send the text data 213 to the NLP system 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the NLP system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the NLP system 120 may perform speech processing using two different components (e.g., the ASR component 250 and the NLU component 260). One skilled in the art will appreciate that the NLP system 120, in at least some examples, may implement a spoken language understanding (SLU) component that is configured to process audio data 211 to generate NLU results data.

In some examples, the SLU component may be equivalent to the ASR component 250 and the NLU component 260. For example, the SLU component may process audio data 211 and generate NLU results data. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple hypotheses in the form of a lattice or an N-best list with individual hypotheses corresponding to confidence scores or other scores (such as probability scores, etc.).

The NLP system 120 may communicate with one or more skill systems 125. A skill system 125 may be configured to execute with respect to NLU results data. For example, a weather skill system may determine weather information for a geographic location represented in a user profile or corresponding to a location of the device 110 that captured a corresponding natural language input. For further example, a taxi skill system may book a requested ride. In another example, a restaurant skill system may place an order for a pizza. A skill system 125 may operate in conjunction between the NLP system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The NLP system 120 may include a TTS component 280. The TTS component 280 may generate audio data (e.g., synthesized speech) from text data using one or more different methods. Text data input to the TTS component 280 may come from a skill system 125, the orchestrator component 230, or another component of the NLP system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The NLP system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, or other non-voice user identifying information), received by the NLP system 120 in correlation with a natural language input, to stored biometric data of users. The user recognition component 295 may additionally or alternatively perform user recognition by comparing image data (e.g., including a representation of at least a feature of a user), received by the NLP system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the NLP system 120 and/or other systems.

The NLP system 120 may include profile storage 270. The profile storage 270 may include a variety of information related to individual users, groups of users, devices, etc. that interact with the NLP system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the NLP system 120 with permission to allow the skill system 125 to execute with respect to the user's natural language inputs. If a user does not enable a skill system 125, the NLP system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 3:
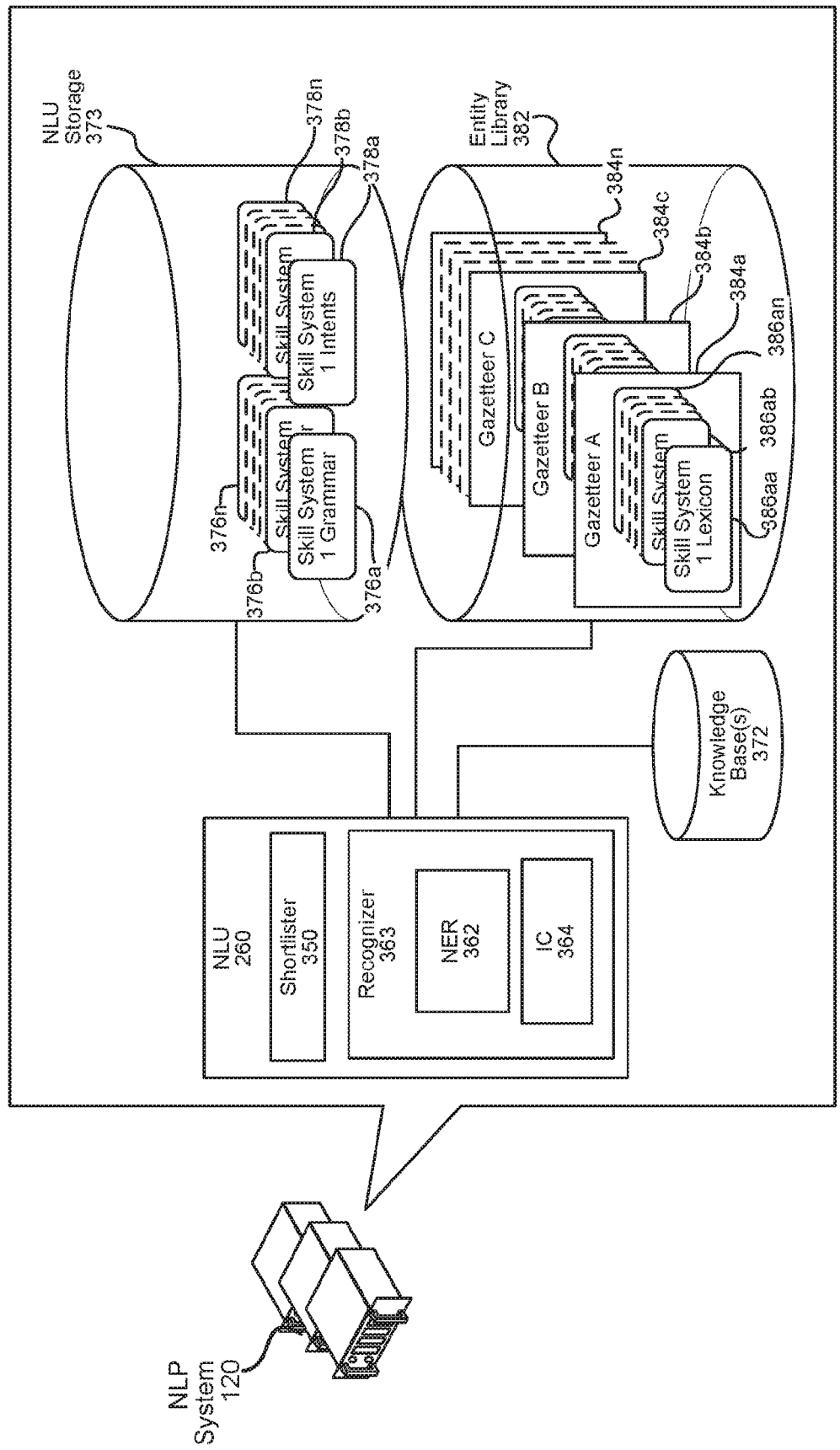
FIG. 3 is a conceptual diagram of how natural language processing is performed, in accordance with embodiments of the present disclosure.

FIG. 3 illustrates how NLU processing may be performed. The NLU component 260 may process text data either output by ASR processing or as received from the device 110b. With respect to ASR generated text data, the NLU component 260 may process a single ASR hypothesis or multiple ASR hypotheses.

The NLU component 260 may include a shortlister component 350. The shortlister component 350 selects skill systems 125 that may execute with respect to the natural language input. Without a shortlister component 350, the NLU component 260 may process a given hypothesis with respect to every skill system 125 in communication with the NLP system 120, either in parallel, in series, or using some combination thereof. The shortlister component 350 thus limits downstream, more resource intensive NLU processes from being performed with respect to skill systems 125 that are unable to, or unlikely to be able to, execute with respect to the natural language input. This reduces total compute power and latency attributed to NLU processing.

The shortlister component 350 may include one or more trained models. The model(s) may be trained to recognize various forms of natural language inputs that may be received by the NLP system 120. For example, during a training period, a skill system 125 may provide the NLP system 125 with training text data representing sample natural language inputs that may be provided by a user to invoke the skill system 125. For example, a taxi skill system may provide the NLP system 120 with training text data corresponding to "get me a cab to [location]," "get me a ride to [location]," "book me a cab to [location]," "book me a ride to [location]," etc.

The NLP system 120 may query a skill system 125 regarding whether other natural language input structures are permissible, with the other natural language input structures being generated by the NLP system 120. The NLP system 120 may derive the other natural language input structure(s) using one or more trained models.

A skill system 125 may also provide the NLP system 120 with training text data indicating grammar and annotations.

The NLP system 120 may use the training text data representing the sample natural language input(s), the NLP system-determined related natural language input structure(s), the grammar, and/or the annotations to train a model that may determine when a natural language input is likely to be executable by a skill system 125. The NLP system 120 may use the sample natural language inputs, provided by skill system 125, and related sample natural language inputs, generated by the NLP system 120, as binary examples to train a model associated with the skill system 125. For example, some sample natural language inputs may be positive examples (e.g., natural language inputs that may be used to invoke the skill system 125 at runtime). Other sample natural language inputs may be negative examples (e.g., natural language inputs that may not be used to invoke the skill system 125 at runtime).

The shortlister component 350 may implement more than one trained model, with each trained model being trained with respect to a different skill system 125. Alternatively, the shortlister component 350 may use one trained model per domain, such as one trained model for weather skill systems, one trained model for taxi skill systems, one trained model for music skill systems, etc.

In at least some examples, the shortlister component 350 may implement a single trained model. The single trained model may include a portion trained with respect to characteristics (e.g., semantic characteristics) shared by all skill systems 125 that communicate with the NLP system 125. The single trained model may also include skill system-specific portions, with each skill system-specific portion being trained with respect to different skill system 125 (or different domain of skill systems 125). The single trained model may also or alternatively include domain-specific potions, with each domain-specific portion being trained with respect to skill systems 125 of a different domain. Implementing a single model with skill system-specific or domain-specific portions may result in less latency than implementing a different trained model for each skill system because the single model with skill system-specific or domain-specific portions limits the number of characteristics processed on a per skill system level.

A portion trained with respect to characteristics shared by more than one skill system may be clustered based on domain. For example, a first portion, of the portion trained with respect to multiple skill systems, may be trained with respect to weather skill systems, a second may be trained with respect to music skill system, a third portion may be trained with respect to travel skill systems, etc.

Clustering may be not beneficial in every instance because it may cause the shortlister component 350 to output indications of only a portion of the skill systems 125 that the natural language input may be executed by. For example, a natural language input may correspond to "tell me about Tom Collins." If the model is clustered based on domain, the shortlister component 350 may determine the natural language input corresponds to a recipe skill system (e.g., a drink recipe) even though the natural language input may also correspond to an information skill system (e.g., including information about a person named Tom Collins).

Training the shortlister component 350 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. In at least some examples, each recognizer 363 may be associated with a different skill system 125. In at least some other examples, each recognizer 363 may be associated with a different domain.

If the shortlister component 350 determines text data (either received from the device 11b or corresponding to an ASR hypothesis) is potentially associated with multiple skill systems 125, the recognizers 363 associated with the skill systems 125 may be invoked to process the text data. The selected recognizers 363 may process the text data in parallel, in series, partially in parallel, etc. For example, if text data potentially corresponds to both a communications skill system and a music skill system, a recognizer associated with the communications skill system may process the text data in parallel, or partially in parallel, with a recognizer associated with the music skill system processing the text data.

The NLU component 260 may communicate with various storages. The NLU component 260 may communicate with an NLU storage 273, which includes skill system grammars (376a-376n), representing how natural language inputs may be formulated to invoke respective skill systems 125, and skill system intents (378a–378n), representing intents supported by respective skill systems 125.

Each recognizer 363 may include a named entity recognition (NER) component 362. An NER component 362 attempts to identify grammars and lexical information that may be used to construe meaning with respect to text data input therein. An NER component 362 identifies portions of text data that correspond to a named entity that may be recognizable by the NLP system 120. An NER component 362 (or other component of the NLU component 260) may also determine whether a word refers to an entity that is not explicitly mentioned in the text, for example "him," "her," "it" or other anaphora, exophora or the like.

Each recognizer 363, and more specifically each NER component 362, may be associated with a particular grammar 376, a particular intent(s) 378, and a particular personalized lexicon 386 (stored in an entity library 382). A gazetteer 384 may include skill system-indexed lexical information associated with a particular user. For example, Gazetteer A (384a) may include skill system-indexed lexical information 386aa to 386an. A user's music skill system lexical information might include album titles, artist names, and song names, for example, whereas a user's contact list skill system lexical information might include the names of contacts. Since every user's music collection and contact list is presumably different, this personalized information may improve entity resolution.

An NER component 362 applies grammar models 376 and lexical information 386 associated with a skill system 125 to determine a mention one or more entities in text data input therein. In this manner, an NER component 362 identifies "slots" (i.e., particular words in text data) that may be needed for later processing. An NER component 362 may also label each slot with a type (e.g., noun, place, city, artist name, song name, etc.).

Each grammar model 376 may include the names of entities (i.e., nouns) commonly found in speech about a particular skill system 125 to which the grammar model 376 relates, whereas lexical information 386 is personalized to the user identifier output by the user recognition component 295 for the natural language input. For example, a grammar model 376 associated with a shopping skill system may include a database of words commonly used when people discuss shopping.

A downstream process called named entity resolution actually links a portion of text data (identified by an NER component 362) to specific entity known to the NLP system 120. To perform named entity resolution, the NLU component 260 may use gazetteer information (384a-384n) stored in the entity library storage 382. The gazetteer information 384 may be used to match text data (identified by an NER component 362) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 363 may also include an intent classification (IC) component 364. An IC component 364 parses text data input thereto to determine an intent(s) of a skill system 125 that potentially corresponds to the natural language input represented in the text data. An intent corresponds to an action to be performed that is responsive to the natural language input represented by the text data. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 378 associated with the skill system that is associated with the recognizer 363 implementing the IC component 364.

The intents identifiable by a specific IC component 364 may be linked to skill system-specific grammar frameworks 376 with "slots" to be filled. Each slot of a grammar framework 376 corresponds to a portion of text data that an NER component 362 believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type / semantic meaning. An NER component 362 may parse text data using heuristic grammar rules, or a model may be constructed using techniques such as hidden Markov models, maximum entropy models, log linear models, conditional random fields (CRF), and the like. For example, an NER component 362, implemented by a music skill system or music domain recognizer 363, may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music skill system or domain, which an IC component 364 may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the skill system 125 (in the knowledge base 372). For example, if the text data corresponds to "play songs by the rolling stones," after failing to determine an album name or song name called "songs" by "the rolling stones," the NER component 362 may search a music skill system vocabulary for the word "songs." In the alternative, generic words may be checked before the gazetteer information, or both may be tried, potentially producing two different results.

The NLU component 260 may tag text data to attribute meaning thereto. For example, the NLU component 260 may tag "play mother's little helper by the rolling stones" as: {skill system} Music, {intent} Play Music, {artist name} rolling stones, {media type} SONG, and {song title} mother's little helper. For further example, the NLU component 260 may tag "play songs by the rolling stones" as: {skill system} Music, {intent} Play Music, {artist name} rolling stones, and {media type} SONG.

Figure 4:
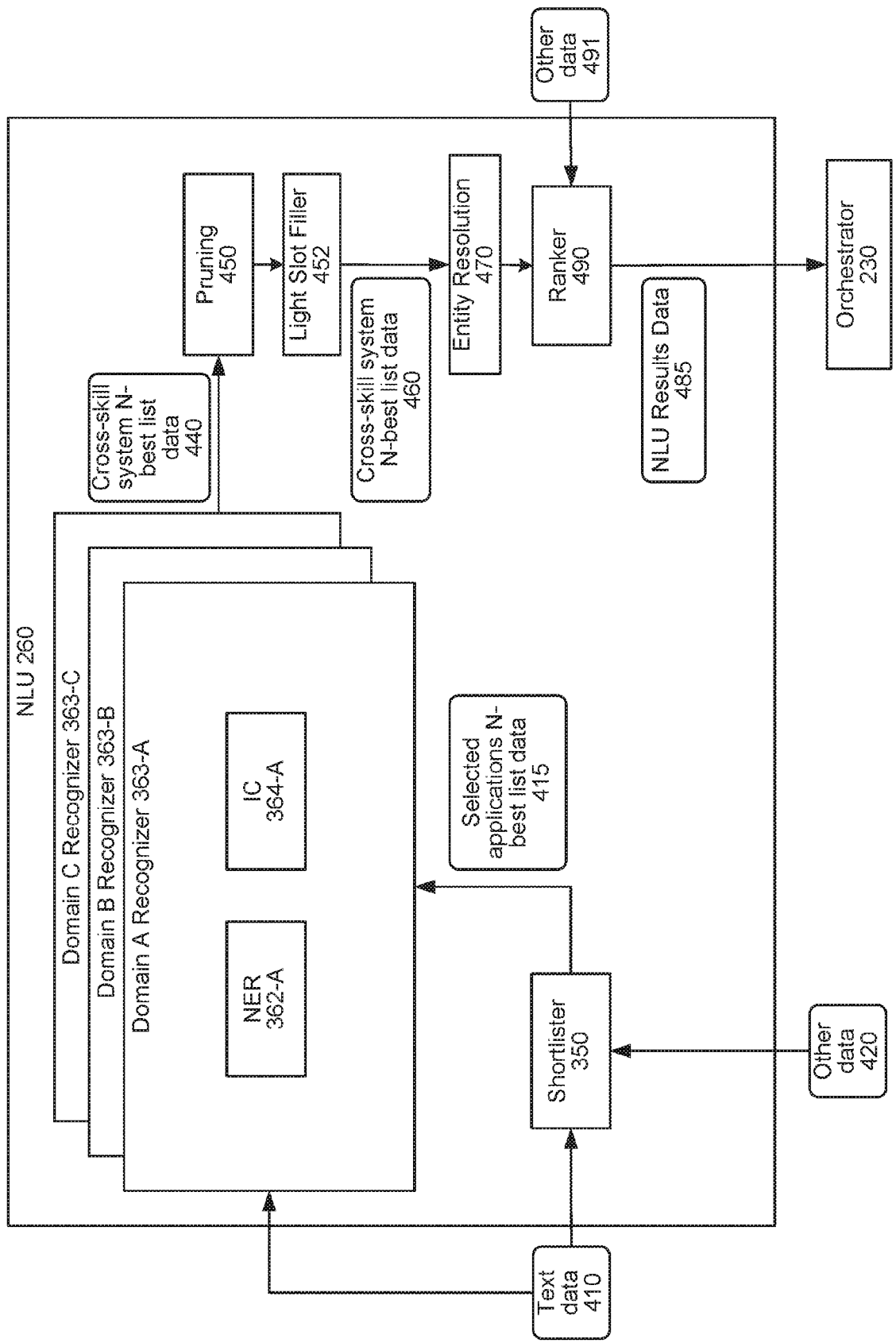
FIG. 4 is a conceptual diagram of how natural language processing is performed, in accordance with embodiments of the present disclosure.

The shortlister component 350 may receive text data 410 (output from the ASR component 250 or received from the device 110b) (as illustrated in FIG. 4). The ASR component 250 or orchestrator component 230 may embed the text data 410 into a form processable by a trained model(s) using sentence embedding techniques as known in the art. Sentence embedding results in the text data 410 including text in a structure that enables the trained models of the shortlister component 350 to operate on the text data 410. For example, an embedding of the text data 410 may be a vector representation.

The shortlister component 350 may make binary determinations (e.g., yes or no) regarding which skill system(s) 125 relates to the text data 410. The shortlister component 350 may make such determinations using the one or more trained models described herein above. If the shortlister component 350 implements a single trained model for each skill system 125, the shortlister component 350 may simply run the models that are associated with enabled skill systems 125 as indicated in a profile associated with the device 110 (that sent data representing the natural language input to the NLP system 120) and/or user identifier output by the user recognition component 295.

The shortlister component 350 may generate N-best list data 415 representing skill systems 125 that may execute with respect to the natural language input represented in the text data 410. The size of the N-best list represented in the N-best list data 415 is configurable. In an example, the N-best list data 415 may indicate every skill system 125 in communication with the NLP system 120, as well as contain an indication, for each skill system 125, regarding whether the skill system 125 is likely capable of performing an action responsive to the natural language input represented in the text data 410. In another example, instead of indicating every skill system 125 in communication with the NLP system 120, the N-best list data 415 may only indicate skill systems 125 that are likely capable of performing an action responsive to the natural language input represented in the text data 410. In yet another example, the shortlister component 350 may implement thresholding such that the N-best list data 415 may indicate no more than a maximum number of skill systems 125 that are likely capable of performing actions responsive to the natural language input represented in the text data 410. In another example, only skill systems 125 associated with confidence scores satisfying a threshold confidence score may be represented in the N-best list data 415.

The text data 410 may include more than one ASR hypothesis. When this occurs, the shortlister component 350 may output a different N-best list (represented in the N-best list data 415) for each ASR hypothesis. Alternatively, the shortlister component 350 may output a single N-best list representing the skill systems 125 that are related to the multiple ASR hypotheses.

As indicated above, the shortlister component 350 may implement thresholding such that an N-best list output therefrom may include no more than a threshold number of entries. If the text data 410 includes more than one ASR hypothesis, the N-best list output by the shortlister component 350 may include no more than a threshold number of entries irrespective of the number of ASR hypotheses output by the ASR component 250. Alternatively or additionally, the N-best list output by the shortlister component 350 may include no more than a threshold number of entries for each ASR hypothesis.

In addition to making a binary determination regarding whether a skill system 125 potentially relates to the text data 410, the shortlister component 350 may generate confidence scores representing likelihoods that skill systems 125 relate to the text data 410. If the shortlister component 350 implements a different trained model for each skill system 125, the shortlister component 350 may generate a different confidence score for each individual skill system-trained model that is run. If the shortlister component 350 runs the models of every skill system 125, the shortlister component 350 may generate a different confidence score for each skill system 125 in communication with the NLP system 120. If the shortlister component 350 runs the models of only skill systems 125 indicated as enabled in a profile associated with the device 110 (that sent data representing the natural language input to the NLP system 120) and/or user identifier output by the user recognition component 295, the shortlister component 350 may only generate a different confidence score for each enabled skill system 125. If the shortlister component 350 implements a single trained model with skill system-specific portions, the shortlister component 350 may generate a different confidence score for each skill system 125 who's specifically trained portion is run. The shortlister component 350 may perform matrix vector modification to obtain confidence scores for all skill systems 125 with respect to which the shortlister component 350 processes.

Illustrative N-best list data 415, including confidence scores, that may be output by the shortlister component 350 may be represented as:
Search skill system, 0.67
Recipe skill system, 0.62
Information skill system, 0.57
Event skill system, 0.42

As indicated, the confidence scores output by the shortlister component 350 may be numerical. The confidence scores output by the shortlister component 350 may alternatively be binned values (e.g., high, medium, low).

The shortlister component 350 may consider other data 420 when determining confidence score for skill systems 125 that may perform actions responsive to the natural language input represented in the text data 410. The other data 420 may include usage history data associated with the device 110 (that sent data representing the natural language input to the NLP system 120) and/or user identifier output by the user recognition component 295. For example, a confidence score of a skill system 125 may be increased if natural language inputs captured by the device 110 and/or originated from the user 5 routinely invoke the skill system 125. Conversely, a confidence score of skill system 125 may be decreased if natural language inputs captured by the device 110 and/or originated from the user 5 rarely invoke the skill system 125.

The other data 420 may be character embedded prior to being input to the shortlister component 350. The other data 420 may alternatively be embedded using other techniques known in the art prior to being input to the shortlister component 350.

The other data 420 may also include data indicating the skill systems 125 that are enabled with respect to the device 110 (that sent data representing the natural language input to the NLP system 120) and/or user identifier output by the user recognition component 295. The shortlister component 350 may use such data to determine which skill system-specific trained model to run. That is, the shortlister component 350 may determine to only run the trained models associated with enabled skill systems 125. The shortlister component 350 may alternatively use such data to alter confidence scores of skill systems 125.

As an example, considering two skill systems 125, one enabled and another unenabled, the shortlister component 350 may run a first model specific to the unenabled skill system as well as a second model specific to the enabled skill system. Alternatively, the shortlister component 350 may run a model configured to determine a score for each skill system. The shortlister component 350 may determine a confidence score of 0.60 for each of the unenabled skill system and the enabled skill system in the first instance. The shortlister component 350 may then alter those confidence scores based on which skill system is enabled. For example, the shortlister component 350 may increase the confidence score associated with the enabled skill system while leaving the confidence score associated with the unenabled skill system the same. Alternatively, the shortlister component 350 may leave the confidence score associated with the enabled skill system the same while decreasing the confidence score associated with the unenabled skill system. Moreover, the shortlister component 350 may increase the confidence score associated with the enabled skill system as well as decrease the confidence score associated with the unenabled skill system.

When the shortlister component 350 receives the text data 410, the shortlister component 350 may determine whether profile data associated with the user 5 and/or device 110 includes an indication of enabled skill systems 125.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such other data to determine which skill system-specific trained model(s) to run. For example, if the device 110 corresponds to a displayless type device, the shortlister component 350 may determine not to run trained models specific to skill systems 125 that output video data. The shortlister component 350 may alternatively use such other data to alter confidence scores of skill systems 125. For example, if the device 110 corresponds to a displayless type device, the shortlister component 350 may decrease a confidence score for a skill system that outputs video data and/or increase a confidence score for a skill system that only outputs audio data.

The type of device information represented in the other data 420 may represent output capabilities of a device to be used to output content to the user, which may not be the device that sent data representing the natural language input to the NLP system 120. For example, a user may speak "play Game of Thrones" to a device not including a display. The NLP system 120 may determine a smart TV or other display device (associated with the same user profile as the device that sent the data representing the natural language input to the NLP system 120) for outputting Game of Thrones. Thus, the other data 420 may represent the smart TV of other display device, and not the displayless device.

The other data 420 may also include data indicating the device 110's speed, location, or other mobility information. For example, the device 110 may correspond to a vehicle including a display. If the vehicle is moving, the shortlister component 350 may decrease the confidence score associated with a skill system 125 that generates video data as it may be undesirable to output video content to a user while the user is driving. A device 110 may output data to the NLP system 120 indicating when the device 110 is moving.

The other data 420 may also include data indicating a currently invoked skill system 125. For example, a user may speak a first (e.g., a previous) natural language input resulting in a music skill system being invoked to output music. As the music is being output, the NLP system 120 may receive a second (e.g., the current) natural language input. The shortlister component 350 may use such data to alter confidence scores of skill systems 125. For example, the shortlister component 350 may run a first model specific to a first skill system as well as a second model specific to a second skill system. The shortlister component 350 may determine a confidence score of 0.60 for each of the skill systems in the first instance. The shortlister component 350 may then alter the original confidence scores based on the first skill system causing music to be output while the current command was received. Based on the first skill system being invoked, the shortlister component 350 may (i) increase the confidence score associated with the first skill system while leaving the confidence score associated with the second skill system the same, (ii) leave the confidence score associated with the first skill system the same while decreasing the confidence score associated with the second skill system, or (iii) increase the confidence score associated with the first skill system as well as decrease the confidence score associated with the second skill system.

The shortlister component 350 may send the N-best list data 415 to recognizers 363 associated with skill systems 125. Alternatively, the shortlister component 350 may send the N-best list data 415 or some other indicator of the selected subset of skill systems 125 to another component (such as the orchestrator component 230), which may in turn send the N-best list data 415 to the recognizers 363 corresponding to the skill systems 125 included in the N-best list data 415. If the shortlister component 450 generates an N-best list representing skill systems 125 without any associated confidence scores, the shortlister component 450 / orchestrator component 230 may send the N-best list data 415 to recognizers 363 associated with skill systems 125 that the shortlister component 350 determines as being capable of performing actions responsive to the natural language input. If the shortlister component 350 generates an N-best list representing skill systems 125 with associated confidence scores, the shortlister component 350 / orchestrator component 230 may send the N-best list data 415 to recognizers 363 associated with skill systems 125 associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into cross-skill system N-best list data 440, and may send the cross-skill system N-best list data 440 to a pruning component 450. Each entry of tagged text represented in the cross-skill system N-best list data 440 may be associated with a respective score indicating a likelihood that the tagged text corresponds to the skill system 125 associated with the recognizer 363 from which the tagged text was output. For example, the cross-skill system N-best list data 440 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the tagged text represented in the cross-skill system N-best list data 440 according to their respective scores. The pruning component 450 may then perform score thresholding with respect to the cross-skill system N-best list data 440. For example, the pruning component 450 may select tagged text data, represented in the cross-skill system N-best list data 440, associated with a score satisfying (e.g., meeting and/or exceeding) a threshold score. The pruning component 450 may additionally or alternatively perform number of tagged text entry thresholding. For example, the pruning component 450 may select the top scoring tagged text entries. The pruning component 450 may generate cross-skill system N-best list data 460 including the selected tagged text entries. The purpose of the pruning component 450 is to create a reduced list of tagged text entries so that downstream, more resource intensive, processes may only operate on the tagged text entries that most likely correspond to the natural language input.

The NLU component 260 may also include a light slot filler component 452. The light slot filler component 452 can take text from slots represented in the tagged text entries output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill system N-best list data 460.

The NLU component 260 sends the cross-skill system N-best list data 460 to an entity resolution component 470. The entity resolution component 470 can apply rules or other instructions to standardize labels or tokens from previous stages into an intent/slot representation. The precise transformation may depend on the skill system 125. For example, for a travel skill system, the entity resolution component 470 may transform text corresponding to "Boston airport" to the standard BOS three-letter code referring to the airport. The entity resolution component 470 can refer to a knowledge base that is used to specifically identify the precise entity referred to in each slot of each tagged text entry represented in the cross-skill system N-best list data 460. Specific intent / slot combinations may also be tied to a particular source, which may then be used to resolve the text. In the example "play songs by the stones," the entity resolution component 470 may reference a personal music catalog, Amazon Music account, a user profile, or the like. The entity resolution component 270 may output N-best list data, altered from the cross-skill system N-best list data 460, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 470 that are each specific to one or more different skill systems 125.

The entity resolution component 470 may not be successful in resolving every entity and filling every slot represented in the N-best list represented in the cross-skill system N-best list data 460. This may result in the entity resolution component 470 outputting incomplete results. The NLU component 260 may include a ranker component 490. The ranker component 490 may assign a particular confidence score to each tagged text entry input therein. The confidence score of a particular tagged text entry may be affected by whether the tagged text entry has unfilled slots. For example, if a tagged text entry associated with a first skill system includes slots that are all filled/resolved, the ranker component 490 may assign the tagged text entry a higher confidence score than another tagged text entry including at least some slots that are unfilled/unresolved by the entity resolution component 470.

The ranker component 490 may apply re-scoring, biasing, or other techniques. To do so, the ranker component 490 may consider not only the data output by the entity resolution component 470, but may also consider other data 491. The other data 491 may include a variety of information. For example, the other data 491 may include skill system rating or popularity data. For example, if one skill system has a high rating, the ranker component 490 may increase the score of a tagged text entry associated with that skill system. The other data 491 may also include information about skill systems 125 that have been enabled by the user that originated the natural language user input. For example, the ranker component 490 may assign higher scores to tagged text entries associated with enabled skill systems 125 than tagged text entries associated with skill systems 125 that have not been enabled by the user. The other data 491 may also include data indicating system usage history (e.g., specific to the user), such as if the user that originated the natural language input regularly uses a particular skill system or does so at particular times of day. The other data 491 may additionally include data indicating date, time, location, weather, type of device 110, user identifier, context, as well as other information. For example, the ranker component 490 may consider when any particular skill system 125 is currently active (e.g., music being output by the skill system 125, a game being executed by the skill system 125, etc.).

The ranker component 490 may output NLU results data 485. The NLU results data 485 may include multiple NLU hypotheses, or a single NLU hypothesis. The NLU results data 485 may be sent to the orchestrator component 230.

In at least some examples, an NLU hypothesis may be executable by more than one skill system 125. In other words, more than one skill system 125 (enabled by the user) may be capable of executing with respect to an intent represented in an NLU hypothesis.

The orchestrator component 230 may generate intent / skill system pairs. The intent, of an intent / skill system, pair may be the intent represented in a top scoring NLU hypothesis in the NLU results data 485. The skill system, of an intent / skill system pair, may be a skill system (enabled by the user) that is capable of executing the intent.

Figure 5:
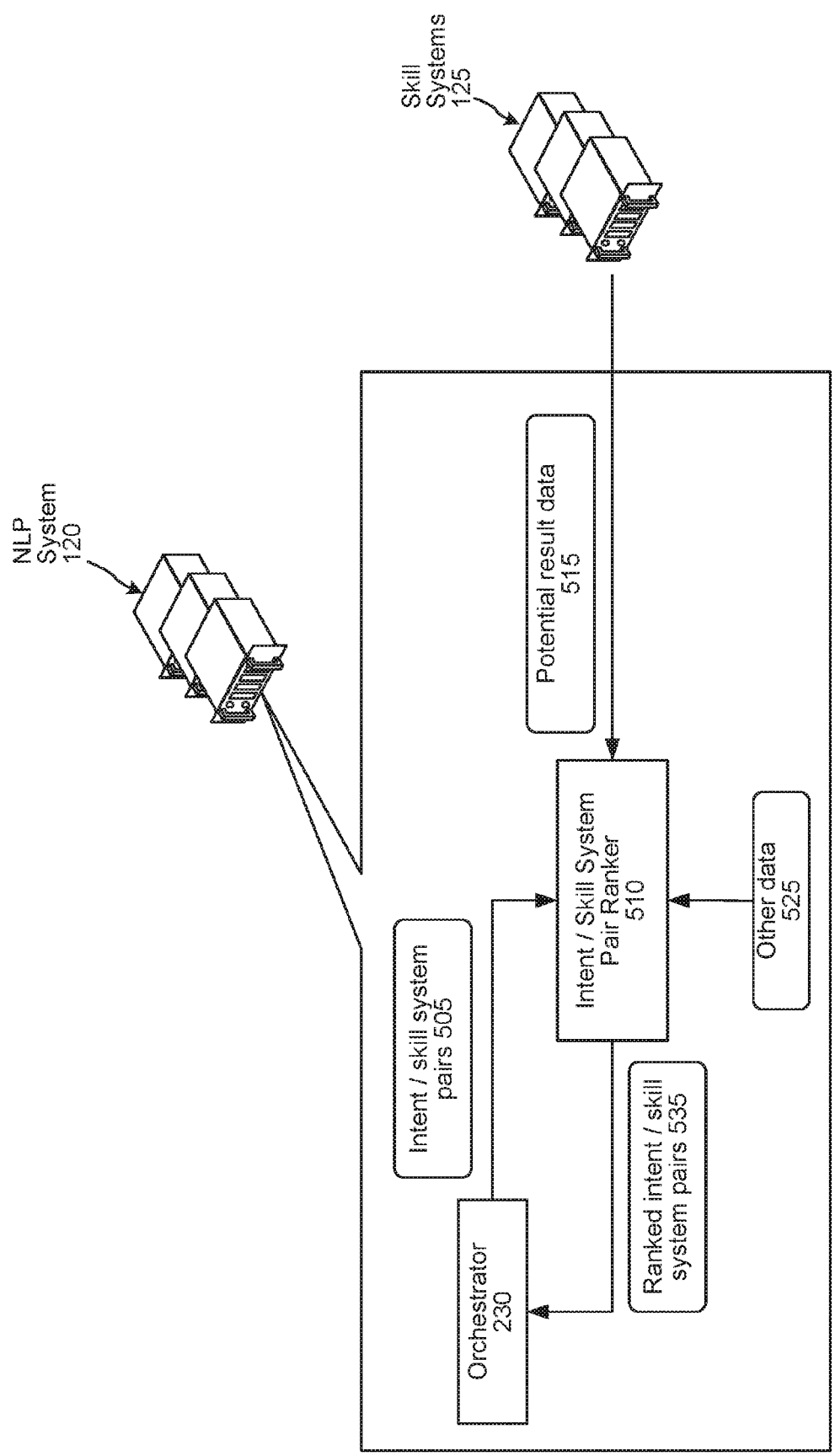
FIG. 5 is a conceptual diagram illustrating example processing of an intent / skill system pair ranker, in accordance with embodiments of the present disclosure.

The orchestrator component 230 may determine two or more intent / skill system pairs based on an NLU hypothesis (represented in the NLU results data 485) and enabled skills represented in a user profile corresponding to a user identifier output by the user recognition component 295. As illustrated in FIG. 5, the orchestrator component 230 may send the two or more intent / skill system pairs 505 to an intent / skill system pair ranker 510. A non-limiting list of intent / skill system pairs 505 may be represented as:

Intent: <PlayMusic>; Skill System: Music Skill System 1; and

Intent: <PlayMusic>; Skill System: Music Skill System 2

The intent / skill system pair ranker 510 may include a statistical component that produces a ranked list of intent / skill system pairs with associated confidence scores. Each confidence score may indicate an adequacy of the skill system's proposed execution of the top-scoring NLU hypothesis. The intent / skill system pair ranker 510 may operate one or more trained models configured to process NLU results data 485, potential result data 515, and other data 525 in order to generate ranked intent / skill system pairs 535.

The intent / skill system pair ranker 510 may query each skill system 125, represented in the intent / skill system pairs 505, for potential result data 515, representing a potential result of a skill system's processing with respect to the top-scoring NLU hypothesis represented in the NLU results data 485. For example, the intent / skill system pair ranker 510 may send the top-scoring NLU hypothesis to a first skill system 125a (represented in a first intent / skill system pair of the intent / skill system pairs 505) along with an instruction for the first skill system 125*a* to indicate whether the first skill system 125*a* can execute with respect to the top-scoring NLU hypothesis, and optionally what action the first skill system 125*a* would perform in response to the top-scoring NLU hypothesis. The intent / skill system pair ranker 510 may also send the top-scoring NLU hypothesis to a second skill system 125*b* (represented in a second intent / skill system pair of the intent / skill system pairs 505) along with an instruction for the second skill system 125*b* to indicate whether the second skill system 125*b* can execute with respect to the top-scoring NLU hypothesis, and optionally what action the second skill system 125*b* would perform in response to the top-scoring NLU hypothesis. The intent / skill system pair ranker 510 may query skill systems 125 in parallel or substantially in parallel, or in series.

In response, the intent / skill system pair ranker 510 may receive, from the first skill system 125*a*, first potential result data 515*a* representing whether the first skill system 125*a* can execute with respect to the top-scoring NLU hypothesis, and optionally what action the first skill system 125*a* would perform in response to the top-scoring NLU hypothesis. The intent / skill system pair ranker 510 may also receive, from the second skill system 125*b*, second potential result data 515*b* representing whether the second skill system 125*b* can execute with respect to the top-scoring NLU hypothesis, and optionally what action the second skill system 125*b* would perform in response to the top-scoring NLU hypothesis.

Potential result data 515 may include various components. For example, potential result data 515 may simply indicate whether or not a skill system 125 can execute with respect to the top-scoring NLU hypothesis.

Potential result data 515 may additionally or alternatively include outputtable data generated by a skill system 125 based on the top-scoring NLU hypothesis. In some situations, a skill system 125 may need further information, in addition to what is represented in the top-scoring NLU hypothesis, to provide outputtable data. In these situations, potential result data 515 may indicate slots of a framework that the skill system 125 further needs filled or entities that the skill system 125 further needs resolved prior to the skill system 125 being able to provided outputtable data responsive to the top-scoring NLU hypothesis.

Potential result data 515 may additionally or alternatively include an instruction indicating how the skill system 125 recommends the NLP system 120 query a user for further information needed by the skill system 125 to generate outputtable data. Potential result data 515 may additionally include an indication of whether the skill system 125 will have all needed information after the user provides additional information a single time, or whether the skill system 125 will need the user to provide various kinds of additional information prior to the skill system 125 having all needed information to generate outputtable data.

The following are non-limiting examples of configurations of potential result data 515:

Skill system 1: indication representing the skill system can execute with respect to the top-scoring NLU hypothesis;

Skill system 2: indication representing the skill system needs an additional resolved entity to generate outputtable data; and Skill system 3: indication representing the skill system can provide numerous outputtable data in response to the top-scoring NLU hypothesis.

The intent / skill system pair ranker 510 may generate a confidence score for each intent / skill system pair represented in the intent / skill system pairs 505. A confidence score may be generated based on the potential result data 515 provided by a skill system 125 corresponding to an intent / skill system pair. For example, a confidence score for an intent / first skill system pair may be generated based on first potential result data 515*a* provided by the first skill system 125*a*, whereas a confidence score for an intent / second skill system pair may be generated based on second potential result data 515*b* provided by the second skill system 125*b*. The intent / skill system pair ranker 510 may generate numeric confidence scores (e.g., from 0.0 to 1.0, or on some other scale) and/or binned confidence scores (e.g., low, medium, high).

The intent / skill system pair ranker 510 may prefer skill systems 125 that provide outputtable data over skill systems 125 that indicate further information is needed and skill systems 125 that indicate multiple outputtable data can be generated. For example, the intent / skill system pair ranker 510 may increase the confidence score, associated with an intent / skill system pair, whose skill system 125 simply provided outputtable data. For further example, the intent / skill system pair ranker 510 may decrease the confidence score, associated with an intent / skill system pair, whose skill system 125 indicated further information is needed. In another example, the intent / skill system pair ranker 510 may decrease the confidence score, associated with an intent / skill system pair, whose skill system 125 indicated multiple outputtable data could be generated.

The intent / skill system pair ranker 510 may additionally or alternatively generate a confidence score based on other data 525.

The other data 525 may include ratings associated with skill systems 125. A ranking may be a NLP system 120 ratings or a user-specific rating. A ranking may indicate a veracity of a skill system 125 from the perspective of one or more users of the NLP system 120. For example, the intent / skill system pair ranker 510 may increase a confidence score, associated with an intent / skill system pair, if the skill system, of the pair, is associated with a rating satisfying (e.g., meeting or exceeding) a threshold rating. For further example, the intent / skill system pair ranker 510 may decrease a confidence score, associated with an intent / skill system pair, if the skill system, of the pair, is associated with a rating failing to satisfy the threshold rating.

The other data 525 may indicate skill systems 125 enabled by the user that originated the natural language input (e.g., indicated as enabled in a user profile associated with a top-scoring user identifier output by the user recognition component 295 with respect to the natural language input). For example, the intent / skill system pair ranker 510 may increase a confidence score, associated with an intent / skill system pair, if the skill system, of the pair, is represented as enabled in a user profile corresponding to the user that originated the natural language input. For further example, the intent / skill system pair ranker 510 may decrease a confidence score, associated with an intent / skill system pair, if the skill system, of the pair, is not represented as enabled (e.g., is not represented) in the user profile of the user that originated the natural language input.

The other data 525 may indicate output capabilities of a device 110 that will be used to output data, responsive to the natural language input, to the user. The system may be configured with devices that include speakers but not displays, devices that include displays by not speakers, and devices that include speakers and displays. If the device 110, that will output data responsive to the natural language input, includes one or more speakers but not a display, the intent / skill system pair ranker 510 may increase the confidence score associated with an intent / skill system pair whose skill system is configured to output audible data (e.g., audio data and/or text data that may undergo TTS processing), and/or decrease the confidence score associated with an intent / skill system pair whose skill system is configured to output visual data (e.g., image data and/or video data). If the device 110, that will output data responsive to the natural language input, includes a display but not one or more speakers, the intent / skill system pair ranker 510 may increase the confidence score associated with an intent / skill system pair whose skill system is configured to output visual data, and/or decrease the confidence score associated with an intent / skill system pair whose skill system is configured to output audible data.

The other data 525 may indicate the type of device 110 that captured the natural language input. For example, the device 110 may correspond to a "hotel room" type if the device 110 is located in a hotel room. If a user inputs a natural language input corresponding to "order me food" to a hotel room device, the intent / skill system pair ranker 510 may increase the confidence score associated with an intent / skill system pair corresponding to a room service skill system associated with the hotel, and/or decrease the confidence score associated with an intent / skill system pair corresponding to a food skill system not associated with the hotel.

The other data 525 may indicate a location of the device 110 and/or a geographic location represented in a user profile corresponding to the top-scoring user identifier output by the user recognition component 295 for the natural language input. A skill system 125 may be configured to only operate with respect to certain geographic locations. For example, a natural language user input may correspond to "when is the next train to Portland." A first skill system 125*a* may operate with respect to trains that arrive at, depart from, and pass through Portland, Oregon. A second skill system 125*b* may operate with respect to trains that arrive at, depart from, and pass through Portland, Maine. If the device 110 is located at, and/or the user profile represents a geographic location of, Seattle, Washington, the intent / skill system pair ranker 510 may increase the confidence score associated with an intent / skill system pair corresponding to the first skill system 125*a* and/or decrease the confidence score associated with an intent / skill system pair corresponding to the second skill system 125*b*. Likewise, if the device 110 is located at, and/or the user profile represents a geographic location of, Boston, Massachusetts, the intent / skill system pair ranker 510 may increase the confidence score associated with an intent / skill system pair corresponding to the second skill system 125*b* and/or decrease the confidence score associated with an intent / skill system pair corresponding to the first skill system 125*a*.

The other data 525 may indicate a time of day. A skill system 125 may be configured to operate with respect to certain times of day. For example, a natural language input may correspond to "order me food." A first skill system 125*a* may operate with respect to times of day corresponding to breakfast. A second skill system natural language input was captured in the morning, the intent / skill system pair ranker 510 may increase the confidence score associated with an intent / skill system pair corresponding to the first skill system 125*a* and/or decrease the score or associated with an intent / skill system pair corresponding to the second skill system 125*b*. Likewise, if the natural language input was captured in the afternoon or evening, the intent / skill system pair ranker 510 may increase the confidence score associated with an intent / skill system pair corresponding to the second skill system 125*b* and/or decrease the confidence score associated with an intent / skill system pair corresponding to the first skill system 125*a*.

The other data 525 may include user preferences represented in a user profile corresponding to the top-scoring user identifier output by the user recognition component 295 for the natural language input. In at least some examples, multiple skill systems 125 may be configured to execute in substantially the same manner. For example, a first skill system 125*a* and a second skill system 125*b* may both be configured to order food from respective restaurants. The NLP system 120 may store a user preference (e.g., in a user profile corresponding to the top-scoring user identifier output by the user recognition component 295 for the natural language input) indicating the user prefers the first skill system 125*a* over the second skill system 125*b*. As a result, the intent / skill system pair ranker 510 may increase the confidence score associated with an intent / skill system pair corresponding to the first skill system 125*a* and/or decrease the confidence score associated with an intent / skill system pair corresponding to the second skill system 125*b*.

The other data 525 may include a system usage history associated with the top-scoring user identifier output by the user recognition component 295 for the natural language input. For example, the system usage history may indicate the user has input natural language inputs that invoke a first skill system 125*a* more often than the user inputs natural language inputs that invoke a second skill system 125*b*. Based on this, if the present natural language input may be executed by both the first skill system 125*a* and the second skill system 125*b*, the intent / skill system pair ranker 510 may increase the confidence score associated with an intent / skill system pair corresponding to the first skill system 125*a* and/or decrease the confidence score associated with an intent / skill system pair corresponding to the second skill system 125*b*.

The other data 525 may indicate a speed at which the device 110, that captured the natural language input, is traveling. For example, the device 110 may be located in a moving vehicle, or may be a moving vehicle itself. When a device 110 is in motion, the intent / skill system pair ranker 510 may be configured to prefer audible outputs rather than visual outputs to decrease the likelihood of distracting a driver of a vehicle. Thus, for example, if the device 110 is moving at or above a threshold speed (e.g., a speed above an average user's walking or running speed), the intent / skill system pair ranker 510 may increase the confidence score associated with an intent / skill system pair corresponding to a first skill system 125*a* that generates audio data or text data that can be converted into audio data using TTS processing. The intent / skill system pair ranker 510 may additionally or alternatively decrease the g confidence score associated with an intent / skill system pair corresponding to a second skill system 125*b* that generates image data or video data.

The other data 525 may indicate a length of time between when a skill system 125 received a query from the intent / skill system pair ranker 510 and when the skill system 125 provided potential result data 515 in response thereto. When the intent / skill system pair ranker 510 queries multiple skill systems 125, the skill systems 125 may respond at different speeds. The intent / skill system pair ranker 510 may implement a latency budget. For example, if the intent / skill system pair ranker 510 determines a skill system 125 responds to a query of the intent / skill system pair ranker 510 within a threshold length of time from receiving the query, the intent / skill system pair ranker 510 may increase the confidence score associated with an intent / skill system pair corresponding to that skill system 125. Conversely, if the intent / skill system pair ranker 510 determines a skill system 125 does not respond to a query of the intent / skill system pair ranker 510 within a threshold length of time from receiving the query, the intent / skill system pair ranker 510 may decrease the confidence score associated with an intent / skill system pair corresponding to that skill system 125.

One skilled in the art will appreciate that the foregoing other data 525 is illustrated, and that other or additional other data 525 may be considered by the intent / skill system pair ranker 510 when determining confidence scores for intent / skill system pairs. Moreover, while foregoing examples describe determining confidence scores for first and second skill systems (125*a*/125*b*), one skilled in the art will appreciate that the intent / skill system pair ranker 510 may determine confidence scores for more than two skill systems.

The intent / skill system pair ranker 510 may implement one or more trained models for determining confidence scores based on potential result data 515 and other data 525. The model(s) of the intent / skill system pair ranker 510 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the intent / skill system pair ranker 510, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 6:
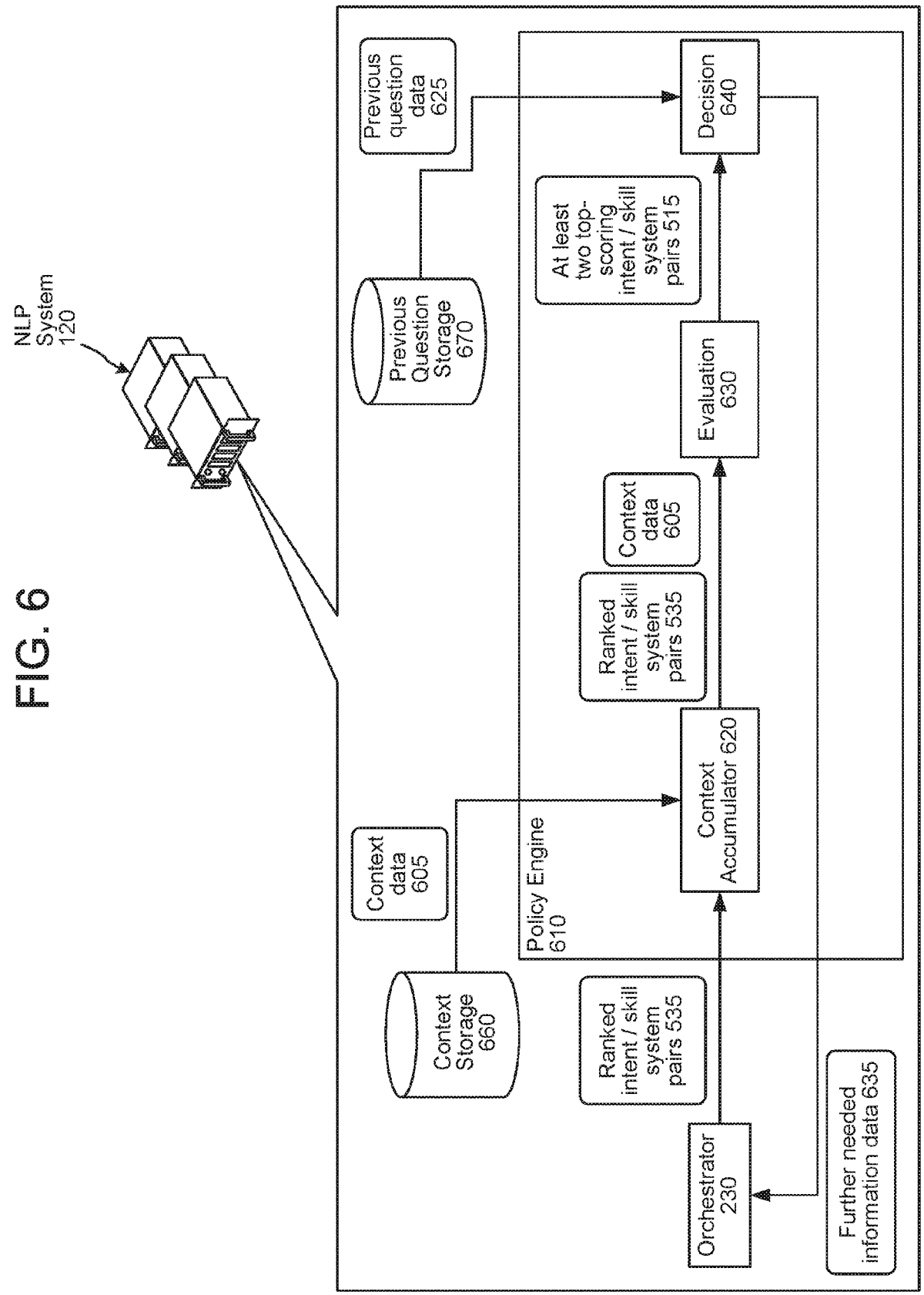
FIG. 6 is a conceptual diagram illustrating example processing of a policy engine, in accordance with embodiments of the present disclosure.

As illustrated in FIG. 6, the orchestrator component 230 may send the ranked intent / skill system pairs 535 (output from the intent / skill system pair ranker 510) to a policy engine 610. Skill systems, represented in the ranked intent / skill system pairs 535, may corresponding to different domains, or all the skill systems may correspond to a single domain.

The policy engine 510 may be configured to determine whether the ranked intent / skill system pairs 535 are sufficiently disambiguated (e.g., the top-scoring intent / skill system pairs' confidence score are sufficiently spread out) such that the policy engine 610 is sufficiently confident that the top-scoring skill system (corresponding to the top-ranked intent / skill system pair in the ranked intent / skill system pairs 535) is to be invoked rather than a different skill system (represented in the ranked intent / skill system pairs 535). In situations where the policy engine 610 determines the intent / skill system pairs 535 are not sufficiently disambiguated, the policy engine 610 may determine what information is needed from a user to sufficient disambiguate the intent / skill system pairs 535. Policies, implemented by the policy engine 610, may be generated from configured rules and/or statistical models.

The policy engine 610 may include a context accumulator component 620. The context accumulator component 620 may query a context storage 660 for context data 605. The context data 605 may include various context that may influence processing of other components of the policy engine 610. For example, the context accumulator component 620 may query the context storage 660 for context data 605 associated with top-scoring user identifier output by the user recognition component 295, and representing one or more previous instances when the received ranked intent / skill system pairs 535 were previously received from the orchestrator component 230. Such context may influence processing of other components of the policy engine 610 because, if the context data 605 represents a previous instance when the ranked intent / skill system pairs were received and a certain skill system was invoked to execute, the policy engine 610 may determine that skill system should be invoked at present as well. Other types of context are also envisioned by the present disclosure.

Context data, in the context storage 660, representing a previous instance when a skill system, corresponding to one pair in ranked intent / skill system pairs, was invoked may have a decay algorithm applied thereto. The decay algorithm may cause a weighting, applied to such context data in calculations by components of the policy engine 610, to decrease over time. This is based on the premise that context data may become less relevant as time transpires from when the context data was stored in the context storage 660. The decay rate applied to a given context data type may be determined using a statistical model.

The context accumulator component 620 may send, to an evaluation component 630 of the policy engine 610, the ranked intent / skill system pairs 535 and the context data 605. The evaluation component 630 may implement one or more rules and/or one or more trained models for evaluating whether scores, in the ranked intent / skill system pairs 535, are sufficiently separated such that the evaluation component 630 may determine, with at least a threshold confidence, that a skill system 125, corresponding to the top-scoring intent / skill system pair in the ranked intent / skill system pairs 535, is to be invoked to execute. In other words, the evaluation component 630 may determine whether a difference between scores, of the intent / skill system pairs 535, is less than a threshold difference.

In at least some examples, the threshold difference may be configurable based on the context data 605. For example, the threshold difference may be less if the context data 605 represents a previous instance of the same ranked intent / skill system pairs 535 in which a skill system was invoked. This is because such context data may provide the evaluation component 630 with greater confidence (represented by the smaller threshold difference that need be satisfied) that that same skill system is to be invoked in the present instance.

If the evaluation component 630 determines a difference between the two greatest scores, in the intent / skill system pairs 535, satisfies (e.g., meets or exceeds) the threshold difference, the evaluation component 630 may send, to the orchestrator component 230, a skill system identifier corresponding to the skill system 125 represented in the top-scoring intent / skill system pair. As a result, the orchestrator component 230 may invoke the skill system, corresponding to the skill system identifier, to execute with respect to the top-scoring NLU hypothesis output by the NLU component 260. If, instead, the evaluation component 630 determines a difference between the two greatest scores, in the intent / skill system pairs 535, fails to satisfy the threshold difference, the evaluation component 630 may send, to a decision component 640 of the policy engine 610, at least the two top-scoring intent / skill system pairs 615 of the ranked intent / skill system pairs 535.

The decision component 640 may determine what type of ambiguity exists (e.g., determine what further information is needed from the user in order for a difference between the scores, corresponding to the at least two top-scoring intent / skill system pairs 615, to satisfy the threshold difference (e.g., to be sufficiently separated)). For example, the decision component 640 may determine a shared intent ambiguity exists when the at least two top-scoring intent / skill system pairs 615 correspond to the same intent but different skill systems. For further example, the decision component 640 may determine a multi-intent and multi-skill system ambiguity exists when the at least two top-scoring intent / skill system pairs 615 correspond to different intents and skill systems. In another example, the decision component 640 may determine sensitivity / security confirmation should be provided when the top-scoring intent / skill system pair corresponds to a low confidence score (e.g., a confidence score below a threshold confidence score), or sensitive processing to be performed by a skill system (e.g., as represented by the intent). Sensitive processing refers to processing performed to executed a sensitive action. Example sensitive actions include outputting bank account information, making a purchase, or other actions that require the use of sensitive user information. In another example, the decision component 640 may determine intent ambiguity exists when NLU processing was unable to determine an intent with at least a threshold confidence. In a further example, the decision component 640 may receive an ASR processing confidence score(s) and determine ambiguity exists when the decision component 640 determines the confidence score(s) fails to satisfy a threshold confidence score (representing ASR has low confidence in the ASR results data).

The decision component 640 may make decisions in view of previous question data 625 received from a previous question storage 670. Even though the evaluation component 630 may indicate further information is needed from the user (as represented by the evaluation component 630 sending the at least two top-scoring intent / skill system pairs 615 to the decision component 640), there may be instances when a benefit of querying the user for such further information may be outweighed by a decrease in user experience. The previous question storage 670 may store previous instance of when further information was queried from users, indexed by user identifier. The decision component 640 may query the previous question storage 670 for previous question data 625 associated with the top-scoring user identifier, output by the user recognition component 295, in the previous question storage 670.

The decision component 640 may determine whether a timestamp corresponding to most recent instance when the user was queried, represented in the previous question data 625 is within a past length of time. If the decision component 640 determines the most recent timestamp is within the past length of time, the decision component 640 may determine the user should not be queried for additional information. Based on such decision, the decision component 640 may send, to the orchestrator component 230, a skill system identifier corresponding to the skill system 125 represented in the top-scoring intent / skill system pair. As a result, the orchestrator component 230 may invoke the skill system, corresponding to the skill system identifier, to execute with respect to the top-scoring NLU hypothesis output by the NLU component 260. If, instead, the decision component 640 determines the most recent timestamp is not within the past length of time, the decision component 640 may send, to the orchestrator component 230, data 635 representing the further needed information (e.g., which of skill system should be invoked, which intent and skill system is correct, etc.).

Figure 7:
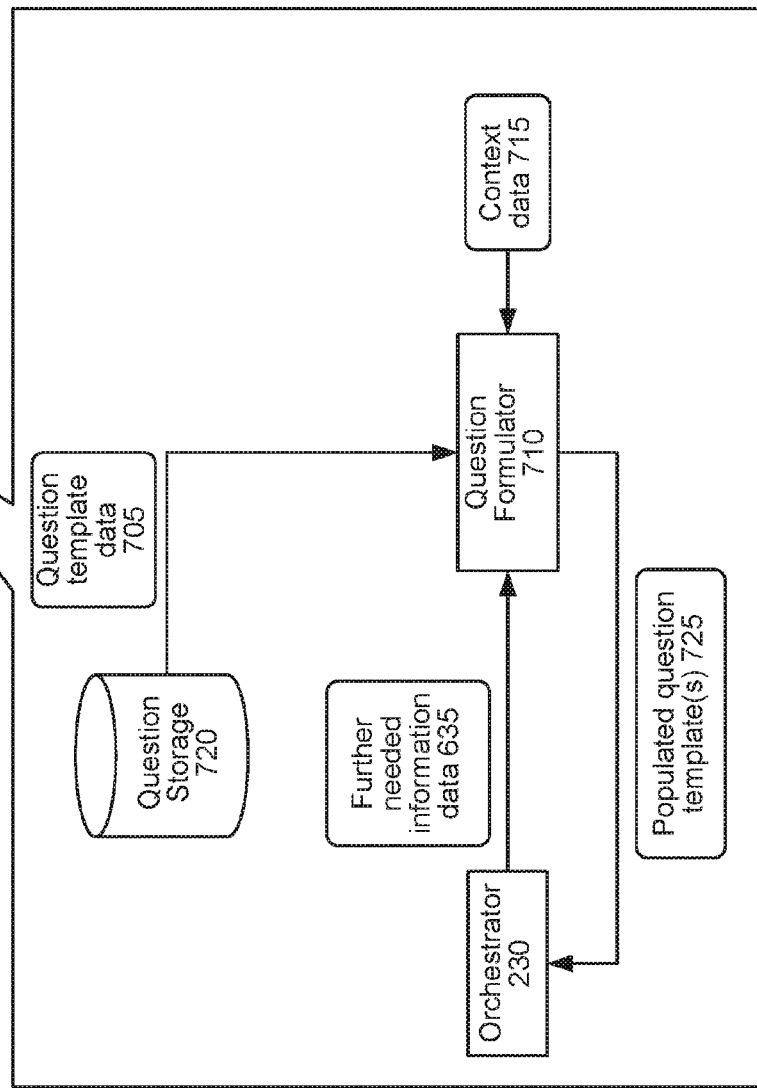
FIG. 7 is a conceptual diagram illustrating example inputs to and outputs of a question formulator component, in accordance with embodiments of the present disclosure.

The orchestrator component 230 may send the further needed information data 635 (and optionally the at least two top-scoring intent / skill system pairs 515) to a question formulator component 710 (as illustrated in FIG. 7). The question formulator component 710 may implemented template-based and/or machine learning-based techniques for determining how the further needed information should be queried to the user. For example, question formulator component 510 may determine how many questions should be queried to the user, as well as how the question(s) should be formatted. In at least some examples, the question formulator component 710 may determine a number and format of questions that is computed to result in the best user experience. However, the question formulator component 710 may not, in at least some configurations, determine how the question(s) should be output to the user. The question formulator component 710 may additionally determine whether feedback should be requested from a user after the question(s) is queried to the user.

The question formulator component 710 may communicate with a question storage 720. The question storage 720 may store templates for questions. In at least some examples, the question templates, stored in the question storage 720, may be indexed by ambiguity type. Example ambiguity types include, but are not limited to, shared intent ambiguity, multi-intent and multi-skill system ambiguity, determine sensitivity / security confirmation, intent ambiguity, and ASR processing error. In at least some examples, the ambiguity types, represented in the question storage 720, may correspond to the different types of ambiguity determinable by the decision component 640 of the policy engine 610.

An ambiguity type, represented in the question storage 720, may be associated with more than one set of questions to output. For example, the shared intent ambiguity type may correspond to a first question template requesting the user confirm a skill system (which may be formatted as "you want the [skill system name], right"), and a second question template requesting the user identify which of multiple skill system should be invoked (which may be formatted as "should I invoke [skill system 1 name] or [skill system 2 name]").

The question formulator component 710 may query the question storage 720 for question template data 705 corresponding to the ambiguity type represented in the further needed information data 635. In at least some instances, the question template data 705 may include various different sets of questions that may be asked of the user to resolve the ambiguity (e.g., provide the further needed information). Sets of questions may have a different number of questions. For example, one set of questions may include a single question, another set of questions may include two questions, another set of questions may include three questions, and so forth.

The question formulator component 710 may implement one or more machine learned models for determining which of the questions should be asked of the user in the present scenario (e.g., which of the sets of questions will resolve the ambiguity with the least number of questions while also having the least negative impact on user experience). The model(s) may consider various context data 715 when making such determination. The context data 715 may include information such as in which turn of a dialog the ambiguity arose, what question shave been output to the user in a past length of time, time of day, device location, etc.

The context data 715 may include a system usage history associated with the top-scoring user identifier output by the user recognition component 295. The system usage history may represent previous natural language inputs and corresponding invoked skills. In at least some examples, the question formulator component 710 may determine a set of questions based on the system usage history. For example, if a system usage history represents the user has previously provided natural language inputs that invoke a first skill system, the question formulator component 710 may select a question template seeking confirmation from the user (e.g., formatted as "you want [skill system 1 name], right") rather than a question template requesting the user identify a skill system (e.g., formatted as "should I invoke [skill system 1 name] or [skill system 2 name]"). For further examples, if a system usage history represents the user has previously provided natural language inputs that invoke the first skill system and the second skill system, the question formulator component 710 may select a question template requesting the user identify which skill system to invoke (e.g., formatted as "should I invoke [skill system 1 name] or [skill system 2 name]").

A decay algorithm may be applied to various portions of the context data. The decay algorithm may cause a weighting, applied to such context data in calculations by the question formulator component 710, to decrease over time. This is based on the premise that context data may become less relevant as time transpires from when the context data was created. The decay rate applied to a given context data type may be determined using a statistical model.

The question formulator component 710 may populate a selected question template(s) using information (e.g., skill system names, intents, etc.) from the at least two top-scoring intent / skill system pairs 515. The question formulator component 710 may send the populated question template(s) 725 to the orchestrator component 230.

The orchestrator component 230 may determine how the populated question template(s) 725 should be output to the user (e.g., as audio, as text, as audio and text, etc.). In at least some examples, the populated question template(s) 725 may be text data representing one or more questions. If the one or more questions are to be output as audio, the orchestrator component 230 may send the text data to the TTS component 280, and receive therefrom audio data representing the one or more questions as synthesized speech.

The orchestrator component 230 may determine how a question should be output based on various context. In at least some examples, the orchestrator component 230 may determine the top-scoring user identifier output by the user recognition component 295, determine a device identifier represented in the user profile and presently associated with a presence indicator (representing the device is presently detecting the user), determine output capabilities of the devices, and cause the question to be output based on the output capabilities. For example, if the device does not have a display, the orchestrator component 30 may cause the question to be represented in audio data. For further example, if the device includes a display and speakers, the orchestrator component 230 may cause the question to be represented in audio data and/or text data.

As illustrated in FIG. 8A, the orchestrator component 230 may send (802) data (e.g., audio data and/or text data) representing a question to a device 110. The device 110 may be the device that captured the original natural language input. Alternatively, the device 110 may be a device that did not capture the original natural language input but that is represented in a same user profile as the device that captured the original natural language input. In the latter example, the device may be a device presently outputting a presence indicator representing the device is presently detecting the user.

The device 110 may output (804) the question as audio and/or present the question as text. If the device 110 simply receives the question as audio data, the device 110 may output the question as audio using a speaker(s) of (or otherwise associated with) the device 110. If the device 110 simply receives the question as text data, the device 110 may present the question as text on a display of (or otherwise associated with) the device 110. If the device 110 receives the question as audio data and text data, the device 110 may output the question as audio using a speaker(s) of (or otherwise associated with) the device 110 and/or present the question as text on a display of (or otherwise associated with) the device 110.

The device 110 may receive (806) an answer to the question 806 from the user. In at least some examples, the device 110 may receive audio corresponding to a spoken natural language answer to the question. In at least some other examples, the device 110 may receive a typed natural language answer to the question. In at least some other examples, the device 110 may present one or more virtual buttons corresponding to one or more potential answers to the question. In such examples, the device 110 may detect a touch event on a display thereof, with the touch event corresponding to the selection of one of the one or more virtual buttons. The device 110 may send, to the orchestrator component 230, data representing which of the virtual buttons was selected. The device 110 may send, to the orchestrator component 230, data representing the answer.

The orchestrator component 230 may determine (166) NLU results data representing the answer to the question. If the orchestrator component 230 receives text data at step 808, the orchestrator component 230 may send the text data to the NLU component 260, and receive therefrom the second NLU results data. If the orchestrator component 230 receives audio data at step 808, the orchestrator component 230 may send the audio data to the ASR component 250, and receive therefrom ASR results data. The orchestrator component 230 may send the ASR results data to the NLU component 260, and receive therefrom the second NLU results data. Alternatively, if the orchestrator component 230 receives audio data at step 808, the orchestrator component 230 may send the audio data to a SLU component, and receive therefrom the second NLU results data.

The orchestrator component 230 may send (810) the first NLU results data, representing the original natural language input, to the intent / skill system pair ranker 510. The orchestrator component 230 may additionally send (812) the second NLU results data, representing the answer to the question, to the intent / skill system pair ranker 510. Using the first and second NLU results data, the intent / skill system pair ranker 510 may determine (814) ranked intent / skill system pairs whereby each pair is associated with a respective confidence score. The intent / skill system pair ranker 510 may send (816) the ranked intent / skill system pairs to the orchestrator component 230.

The orchestrator component 230 may send (818) the ranked intent / skill system pairs to the policy engine 610. The policy engine 610 may, among other things, determine (820) whether a difference between scores, of the ranked intent / skill system pairs, satisfies a threshold difference. If the policy engine 610 determines the difference between the scores still does not satisfy the threshold difference, the policy engine may send (822), to the orchestrator component 230, the further information data described with respect to FIG. 6.

The orchestrator component 230 may send (824) the first needed information data to the question formulator component 710. The question formulator component 710 may, among other things, determine (826) a second question to be used to resolve the ambiguity represented in the further needed information data. The question formulator component 710 may send (828) a populated question template, representing the second question, to the orchestrator component 230. Steps 802 through 820 may then be performed with respect to the second question.

If, at step 820, the policy engine 610 determines the difference between the scores, of ranked intent / skill system pairs, satisfies (e.g., meets or exceeds) the threshold difference, the policy engine 610 may send (830), to the orchestrator component 230, a skill system identifier corresponding to the skill system 125 represented in the top-scoring intent / skill system pair. Thereafter, the orchestrator component 230 may send (176) the first NLU results data (representing the original natural language input) to the skill system 125 corresponding to the skill system identifier. The skill system 125 may then process to perform an action responsive to the original natural language input. Such processing may include the skill system 125 engaging in a dialog with the user to obtain information needed by the skill system 125 to perform an action.

In at least some examples, the policy engine 610 may determine, in the ranked intent / skill system pairs 535, an intent associated with an indicator representing a user should be authenticated prior to an action, corresponding to the intent, being performed. A non-limiting list of intents that may be indicated as such include a <Purchase> intent, an <UnlockDoor> intent, a <LockDoor> intent, an <OutputBankingInformation> intent, an <IncreaseTemperature> intent (which may correspond to increasing the temperature of a house heating system but may also correspond to increasing the temperature of a smart oven), and the like. The question formulator component 710 may generate a populated question template that asks for the user to perform one or more user recognition techniques so the user can be authenticated to a requisite level. Once the user is authenticated to the requisite level, the orchestrator component 230 may invoke a skill system to perform the action.

In at least some examples, the question formulator component 710 may determine user feedback should be requested after ambiguity is resolved and a skill system is finished perform an action responsive to the user's original natural language input. The question formulator component 710 may make such determination based at least in part on how often the user has been requested for feedback within a past length of time.

When the question formulator component 710 determines user feedback should be requested, the question formulator component 710 may send, to the orchestrator component 230, an instruction to gather feedback. The orchestrator component 230 may, once the skill system has finished performing an action responsive to the user's original natural language input, cause feedback to be requested from the user.

Feedback, received from the user, may be used to update one or more models implemented by the policy engine 610 and/or question formulator component 710. Data used to retrain the model(s) may include the feedback provided by the user, the type of ambiguity that was resolved, and user responses to questions output to the user. The system may be selective in what data is used to retain a model(s) in order to prevent the model(s) from being biased.

Figure 9:
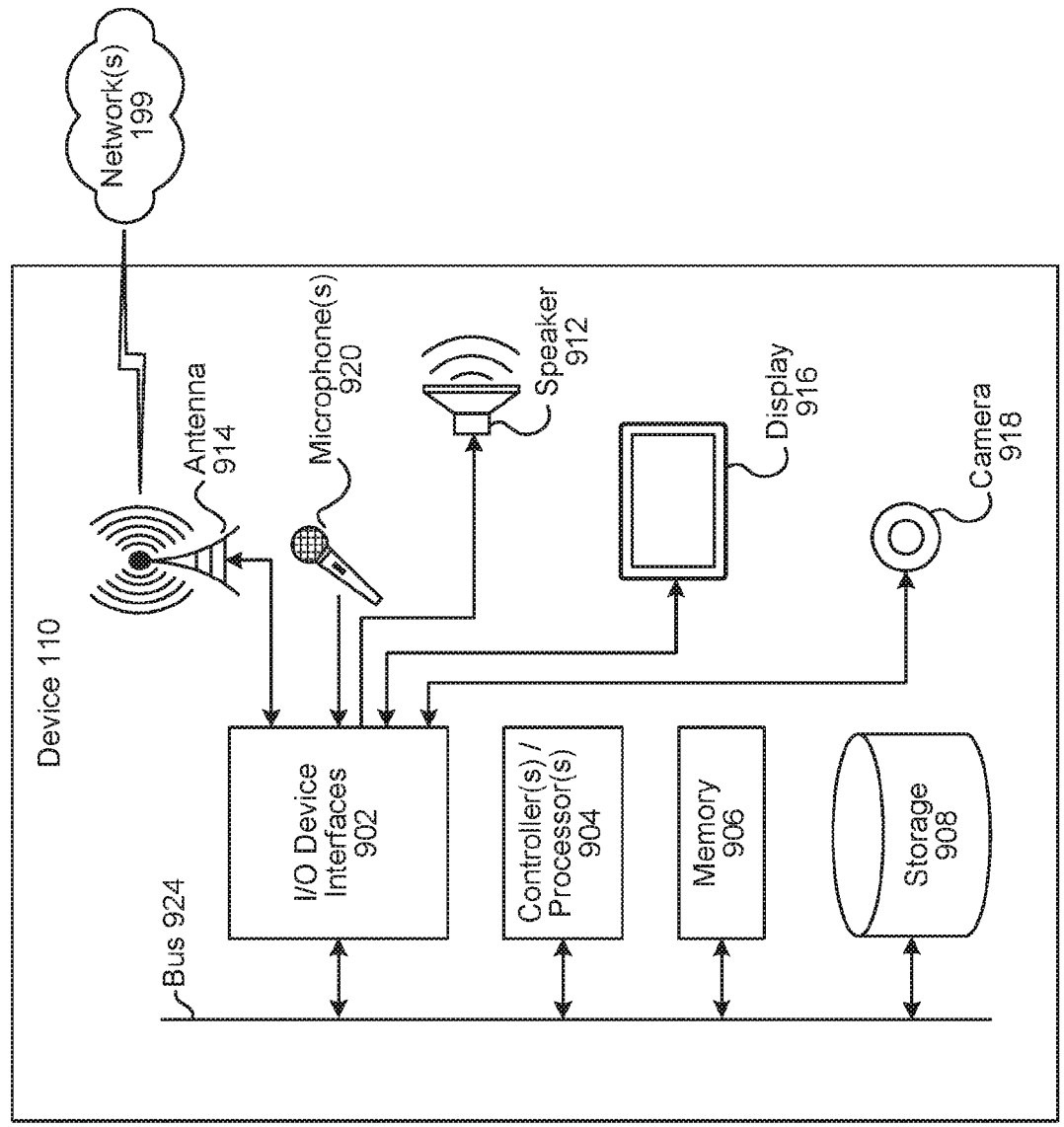
FIG. 9 is a block diagram conceptually illustrating example components of a device, in accordance with embodiments of the present disclosure.
Figure 10:
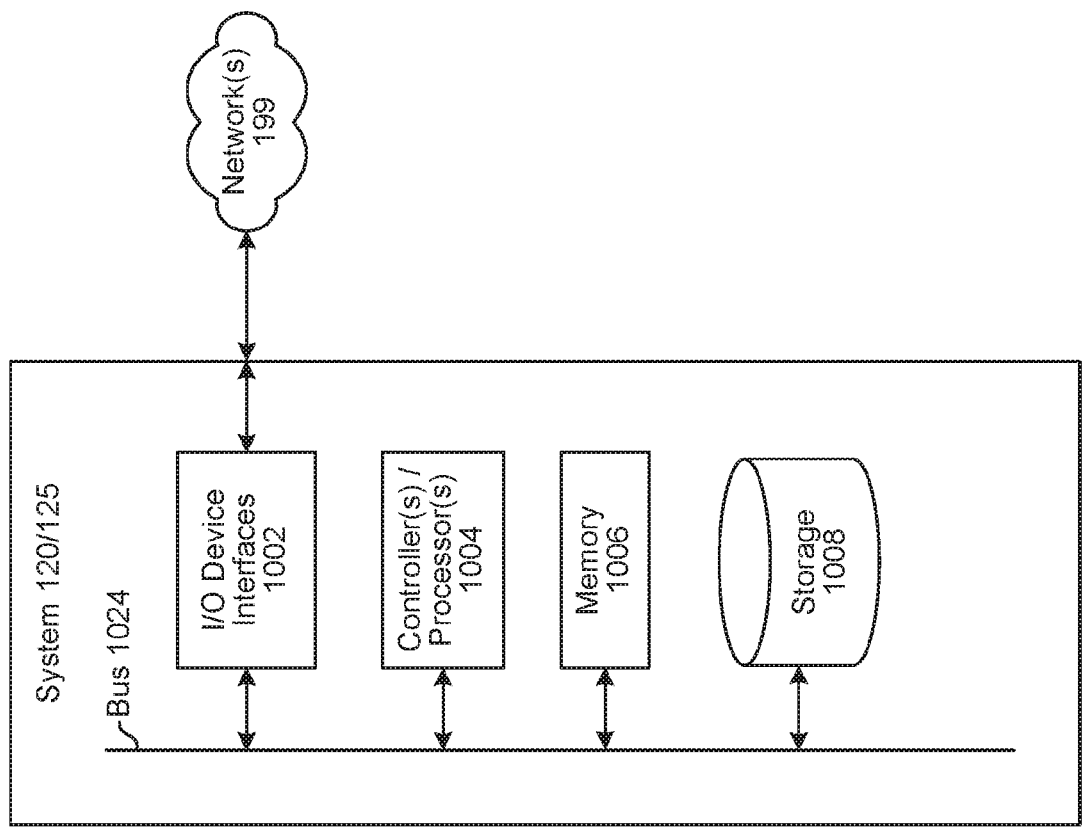
FIG. 10 is a block diagram conceptually illustrating example components of a system, in accordance with embodiments of the present disclosure.

FIG. 9 is a block diagram conceptually illustrating a device 110/112 that may be used with the system. FIG. 10 is a block diagram conceptually illustrating example components of a remote device, such as the natural language processing system 120, which may assist with ASR processing, NLU processing, etc., and a skill system 125. A system (120/125) may include one or more servers. A "server" as used herein may refer to a traditional server as understood in a server / client computing structure but may also refer to a number of different computing components that may assist with the operations discussed herein. For example, a server may include one or more physical computing components (such as a rack server) that are connected to other devices / components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008)

may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language processing system 120, or a skill system 125 may include their own dedicated processors, memory, and/or storage. Alternatively, one or more of the components of the device(s) 110, the natural language processing system 120, or a skill system 125 may utilize the I/O interfaces (902/1002), processor(s) (904/1004), memory (906/1006), and/or storage (908/1008) of the device(s) 110, natural language processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 125, as described herein, are illustrative, and may be located as a stand-alone device or may be included, in whole or in part, as a component of a larger device or system.

Figure 11:
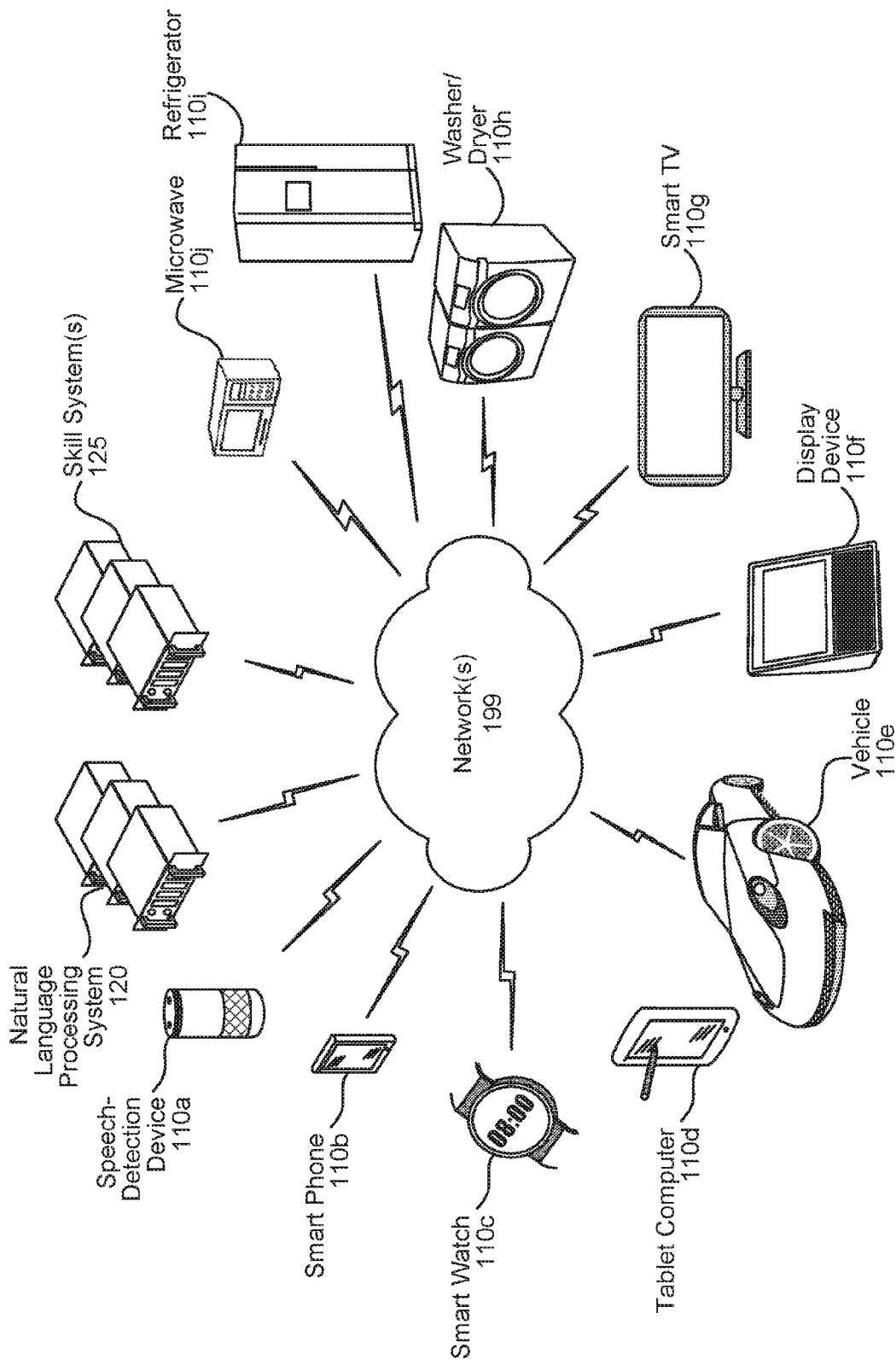
FIG. 11 illustrates an example of a computer network for use with the overall system, in accordance with embodiments of the present disclosure.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving, from a first device, first audio data representing a first natural language input;
performing speech processing with respect to the first audio data to generate first natural language understanding (NLU) results data representing the first natural language input;
using the first NLU results data, determining a first score representing a confidence that a first skill system is to be used to execute with respect to the first NLU results data;
using the first NLU results data, determining a second score representing a confidence that a second skill system is to be used to execute with respect to the first NLU results data;
determining a first difference between the first score and the second score;
determining the first difference fails to satisfy a threshold difference;
after determining the first difference fails to satisfy the threshold difference, generating second audio data representing a question to resolve which of the first skill system or the second skill system is to be used;
sending, to the first device, the second audio data;
after sending the second audio data, receiving, from the first device, third audio data representing a second natural language input corresponding to a response to the question;
performing speech processing with respect to the third audio data to generate second NLU results data representing the second natural language input;
using the first NLU results data and the second NLU results data, determining a third score representing an updated confidence that the first skill system is to be used to execute with respect to the first NLU results data;
using the first NLU results data and the second NLU results data, determining a fourth score representing an updated confidence that the second skill system is to be used to execute with respect to the first NLU results data;
determining a second difference between the third score and the fourth score;
determining the second difference satisfies the threshold difference;
determining the third score is greater than the fourth score; and
after determining the third score is greater than the fourth score, sending, to the first skill system, the first NLU results data,
wherein receipt of the first NLU results data by the first skill system causes the first skill system to perform an action responsive to the first natural language input.

2. The method of claim 1, further comprising:
determining a user identifier corresponding to the first audio data;
identifying usage history data associated with the user identifier;
determining the usage history data is missing a second answer to a second question requesting disambiguation between the first skill system and the second skill system; and
after determining the usage history data is missing the second answer, generating the second audio data.

3. The method of claim 1, further comprising:
after determining the first difference fails to satisfy the threshold difference, determining an information type to be used to arbitrate between the first skill system and the second skill system;
determining question template data corresponding to the information type;
generating text data by populating the question template data with a first name corresponding to the first skill system and a second name corresponding to the second skill system, the text data corresponding to the question; and
performing text-to-speech (TTS) processing with respect to the text data to generate the second audio data.

4. The method of claim 1, further comprising:
receiving, from the first device, fourth audio data representing a third natural language input;
performing speech processing with respect to the fourth audio data to generate third NLU results data representing the third natural language input;
using the third NLU results data, determining a third skill system to be used to execute with respect to the third NLU results data;
determining an NLU intent, represented in the third NLU results data, is associated with an indicator representing a sensitive action is to be performed by the third skill system;
after determining the NLU intent is associated with the indicator, generating fifth audio data requesting a user provide information for recognizing the user through user recognition processing;
sending, to the first device, the fifth audio data;

after sending the fifth audio data, receiving, from the first device, first biometric data;
determining a user identifier corresponding to the fourth audio data;
determining second biometric data associated with the user identifier;
determining the second biometric data corresponds to the first biometric data; and
after determining the second biometric data corresponds to the first biometric data, sending, to the third skill system, the third NLU results data,
wherein receipt of the third NLU results data by the third skill system causes the third skill system to perform the sensitive action.

5. A system comprising:
at least one processor; and
at least one memory comprising instructions that, when executed by the at least one processor, cause the system to:
receive first data representing a natural language input;
determine natural language understanding (NLU) results data comprising at least an intent corresponding to the natural language input;
determine that a first component is to execute with respect to the NLU results data to determine a response to the natural language input;
determine that a second component is to execute with respect to the NLU results data to determine a response to the natural language input;
based at least in part on determining that both the first component and the second component are to execute with respect to the NLU results data, determine further information is needed to determine which of the first component or the second component is to execute with respect to the NLU results data;
determine second data representing a first question to resolve which of the first component or the second component is to execute with respect to the NLU results data;
send, to a first device, the second data;
receive, from the first device, third data representing a first answer to the first question; and
based at least in part on the first answer, cause the first component to execute with respect to the NLU results data instead of the second component.

6. The system of claim 5, wherein the at least one memory further comprises instructions that, when executed by the at least one processor, further cause the system to:
based at least in part on the first answer, determine a first score representing a confidence that the first component is to execute with respect to the NLU results data;
based at least in part on the first answer, determine a second score representing a confidence that the second component is to execute with respect to the NLU results data; and
determine, further based at least in part on the first score and the second score, that the first component is to execute with respect to the NLU results data instead of the second component.

7. The system of claim 5, wherein the at least one memory further comprises instructions that, when executed by the at least one processor, further cause the system to:
determine a user identifier corresponding to the first data;
identify usage history data associated with the user identifier;
determine the usage history data is missing a second answer to a second question requesting disambiguation between the first component and the second component; and
after determining the usage history data is missing the second answer, determine the further information is needed.

8. The system of claim 5, wherein the at least one memory further comprises instructions that, when executed by the at least one processor, further cause the system to:
after determining the further information is needed, determine an information type to be used to resolve which of the first component or the second component is to execute with respect to the NLU results data;
determine first question template data corresponding to the information type; and
determine the second data by populating the first question template data with first component identifying information and second component identifying information.

9. The system of claim 8, wherein the at least one memory further comprises instructions that, when executed by the at least one processor, further cause the system to:
determine second question template data corresponding to the information type;
determine the first question template data corresponds to the first question;
determine the second question template data corresponds to a plurality of questions; and
based at least in part on determining the first question template data corresponds to the first question and the second question template data corresponds to the plurality of questions, determine the second data by populating the first question template data.

10. The system of claim 5, wherein the at least one memory further comprises instructions that, when executed by the at least one processor, further cause the system to:
determine a user identifier corresponding to the first data;
identify usage history data associated with the user identifier, the usage history data representing a previous natural language input that resulted in the first component executing with respect to the NLU results data intent; and
based at least in part on determining the usage history data represents the first component previously executed with respect to the NLU results data, determine the first question to request confirmation that the first component is to execute with respect to the NLU results data.

11. The system of claim 5, wherein the at least one memory further comprises instructions that, when executed by the at least one processor, further cause the system to:
determine the NLU results data is associated with an indicator representing a sensitive action is to be performed;
after determining the NLU results data is associated with the indicator, determine fourth data requesting a user provide information for recognizing the user through user recognition processing;
send, to the first device, the fourth data;
after sending the fourth data, receive, from the first device, first biometric data;
determine the first biometric data corresponds to stored biometric data corresponding to a user identifier; and
after determining the first biometric data corresponds to the stored biometric data, cause the first component to execute with respect to the NLU results data.

12. The system of claim 5, wherein the at least one memory further comprises instructions that, when executed by the at least one processor, further cause the system to:
determine a user identifier corresponding to the first data;
identify usage history data associated with the user identifier;
determine the usage history data represents at least a first previous natural language input that was responded to using the first component;

determine the usage history data represents at least a second natural language input that was responded to using the second component; and based at least in part on the at least first previous natural language input and the at least second previous natural language input, select question template data to be populated with first component identifying information and second component identifying information to generate the second data.

13. A method comprising:

receiving first data representing a natural language input;

determining natural language understanding (NLU) results data comprising at least an intent corresponding to the natural language input;

determining that a first component is to execute with respect to the NLU results data to determine a response to the natural language input;

determining that a second component is to execute with respect to the NLU results data to determine a response to the natural language input;

based at least in part on determining that both the first component and the second component are to execute with respect to the NLU results data, determining further information is needed to determine which of the first component or the second component is to execute with respect to the NLU results data;

determining second data representing a first question to resolve which of the first component or the second component is to execute with respect to the NLU results data;

sending, to a first device, the second data;

receiving, from the first device, third data representing a first answer to the first question; and based at least in part on the first answer, causing the first component to execute with respect to the NLU results data instead of the second component.

14. The method of claim 13, further comprising:

based at least in part on the first answer, determining a first score representing a confidence that the first component is to execute with respect to the NLU results data;

based at least in part on the first answer, determining a second score representing a confidence that the second component is to execute with respect to the NLU results data; and determining, further based at least in part on the first score and the second score, that the first component is to execute with respect to the NLU results data instead of the second component.

15. The method of claim 13, further comprising:

determining a user identifier corresponding to the first data;

identifying usage history data associated with the user identifier;

determining the usage history data is missing a second answer to a second question requesting disambiguation between the first component and the second component; and after determining the usage history data is missing the second answer, determining the further information is needed.

16. The method of claim 13, further comprising:

after determining the further information is needed, determining an information type to be used to resolve which of the first component or the second component is to execute with respect to the NLU results data;

determining first question template data corresponding to the information type; and determining the second data by populating the first question template data with first component identifying information and second component identifying information.

17. The method of claim 16, further comprising:

determining second question template data corresponding to the information type;

determining the first question template data corresponds to the first question;

determining the second question template data corresponds to a plurality of questions; and based at least in part on determining the first question template data corresponds to the first question and the second question template data corresponds to the plurality of questions, determining the second data by populating the first question template data.

18. The method of claim 13, further comprising:

determining a user identifier corresponding to the first data;

identifying usage history data associated with the user identifier, the usage history data representing a previous natural language input that resulted in the first component executing with respect to the NLU results data; and based at least in part on determining the usage history data represents the first component previously executed with respect to the NLU results data, determining the first question to request confirmation that the first component is to execute with respect to the NLU results data.

19. The method of claim 13, further comprising:

determining the NLU results data is associated with an indicator representing a sensitive action is to be performed;

after determining the NLU results data is associated with the indicator, determining fourth data requesting a user provide information for recognizing the user through user recognition processing;

sending, to the first device, the fourth data;

after sending the fourth data, receiving, from the first device, first biometric data;

determining the first biometric data corresponds to stored biometric data corresponding to a user identifier; and after determining the first biometric data corresponds to the stored biometric data, causing the first component to execute with respect to the NLU results data.

20. The method of claim 13, further comprising:

determining a user identifier corresponding to the first data;

identifying usage history data associated with the user identifier;

determining the usage history data represents at least a first previous natural language input that was responded to using the first component;

determining the usage history data represents at least a second natural language input that was responded to using the second component; and based at least in part on the at least first previous natural language input and the at least second previous natural language input, selecting a question template data to be populated with first component identifying information and second component identifying information to generate the second data.

* * * * *